(12) United States Patent
Salloum

(10) Patent No.: US 11,257,108 B2
(45) Date of Patent: Feb. 22, 2022

(54) SYSTEMS AND METHODS FOR DYNAMIC PRODUCT OFFERINGS

(71) Applicant: Samuel Salloum, Dearborn, MI (US)

(72) Inventor: Samuel Salloum, Dearborn, MI (US)

( * ) Notice: Subject to any disclaimer, the term of this patent is extended or adjusted under 35 U.S.C. 154(b) by 0 days.

(21) Appl. No.: 16/746,390

(22) Filed: Jan. 17, 2020

(65) Prior Publication Data
US 2020/0234327 A1 Jul. 23, 2020

Related U.S. Application Data

(60) Provisional application No. 62/794,035, filed on Jan. 18, 2019.

(51) Int. Cl.
| | |
|---|---|
| *G06Q 30/00* | (2012.01) |
| *G06Q 30/02* | (2012.01) |
| *G06Q 10/06* | (2012.01) |
| *G06Q 40/08* | (2012.01) |

(52) U.S. Cl.
CPC ..... *G06Q 30/0239* (2013.01); *G06Q 10/0635* (2013.01); *G06Q 30/0201* (2013.01); *G06Q 40/08* (2013.01)

(58) Field of Classification Search
CPC ............ G06Q 40/08; G06Q 10/0635
See application file for complete search history.

(56) References Cited

U.S. PATENT DOCUMENTS

| | | | |
|---|---|---|---|
| 10,467,704 B1 * | 11/2019 | Konrardy | B60W 40/09 |
| 2018/0137574 A1 * | 5/2018 | Wingate-Whyte | G06Q 30/0631 |
| 2018/0276710 A1 * | 9/2018 | Tietzen | G06N 20/00 |
| 2019/0019203 A1 * | 1/2019 | Jang | G06F 16/9535 |

* cited by examiner

*Primary Examiner* — Alvin L Brown
(74) *Attorney, Agent, or Firm* — Dickinson Wright PLLC; Steven Hurles

(57) ABSTRACT

A method for dynamic product offerings includes identifying characteristics of an entity based on a set of performance indicators and a risk profile associated with the entity. The method further identifies criteria for dynamic product offerings for a target market using the identified characteristics of the entity. The method further includes determining a target reward and an expected risk for a new dynamic product offering using the criteria for the dynamic product offerings. The method further includes one or more actions that cause the new dynamic product offering to be released in the target market.

20 Claims, 34 Drawing Sheets

Fig. 21

SYSTEMS AND METHODS FOR DYNAMIC PRODUCT OFFERINGS

CROSS-REFERENCE TO RELATED APPLICATIONS

This application claims the benefit of U.S. Provisional Application No. 62/794,035 filed on Jan. 18, 2019 and which is hereby incorporated by reference.

TECHNICAL FIELD

This disclosure relates to dynamic product offerings, and in particular, dynamic product offerings as new market instruments. More particularly, this disclosure is directed to the technical fields of big data analytics, artificial intelligence and machine learning, sentiment analysis, and/or the like.

BACKGROUND

Currently, online marketplace customers using platforms such as e-Commerce, e-Logistics, e-Finance, and e-Insurance marketplaces perform a generic keyword search by name of the product or service, description, geography or by name of the product seller or service provider for identification and selection of the right product or service and product supplier or service provider before completing their online purchase of a product or service or entering into a purchase contract or service agreement. The product offerings that fully meet the requirements of the customer are not provided at the initial point of contact, thereby restricting the buy-sell process in terms of speed and assessment of risk when making procurement decisions.

Additionally, inefficient analysis using limited non-validated information across markets may result in low conversion ratios from seeing a product or service to its acquisition.

The product offerings are not scientifically matched based on the entity performance and risk profiles of the participants within the global value chains nor the specific characteristics of the products and services of the transactions.

SUMMARY

An aspect of the disclosed embodiments is a method for dynamic product offerings. The method includes identifying characteristics of an entity based on a set of performance indicators and a risk profile associated with the entity. The method further identifies criteria for dynamic product offerings for a target market using the identified characteristics of the entity. The method further includes determining a target reward and an expected risk for a new dynamic product offering using the criteria for the dynamic product offerings. The method further includes one or more actions that cause the new dynamic product offering to be released in the target market.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 21 illustrates pre-qualified insurance quotes for an e-Insurance dynamic product offering.

DETAILED DESCRIPTION

Figure 1:
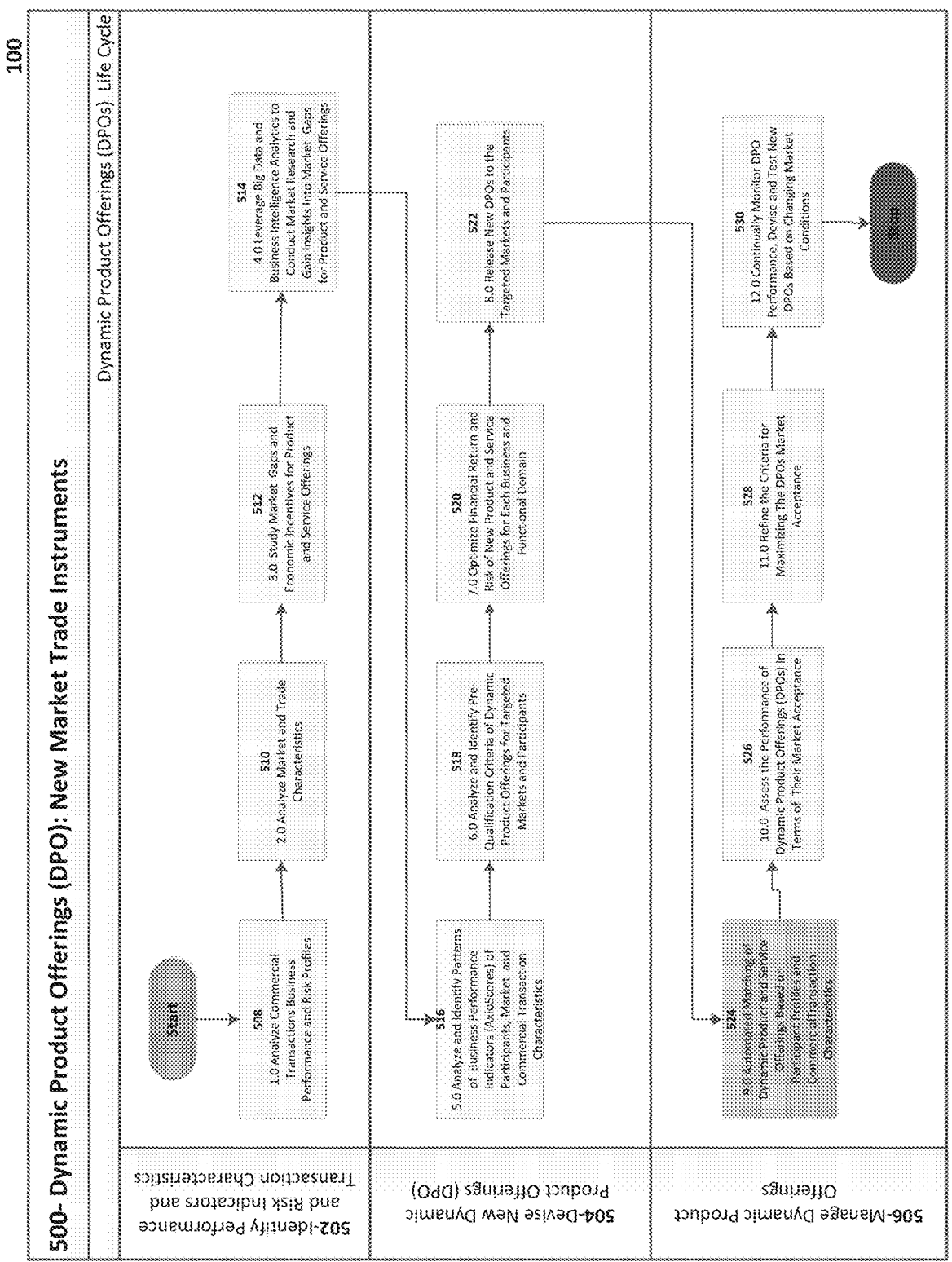
FIG. 1 is a flowchart illustrating a dynamic product offerings process flow according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

An entity, as used herein, may refer to an organization, a group of individuals, an individual, and/or the like. The organization, for example, may include a Logistics Services Provider (LSP), a Carrier Service Provider, a Product Supplier or Service Provider, a Financial Institution, an Insurance Company, and/or the like. A participant, as used herein, may refer to an entity that engages in a transaction with one or more other entities. A transaction, as used herein, may refer to any exchange between two or more entities involving a product, a service, an intangible commodity, and/or the like. In some implementations, the transaction may be a commercial transaction (e.g., an e-commerce transaction). Additionally, or alternatively, the transaction may be a B2B transaction, a B2C transaction, a B2G transaction, a C2C transaction, a G2G transaction, and/or the like.

The embodiments disclosed herein include systems and methods for a dynamic product offering. Products may include goods, services (e.g., trade facilitation services), intangible commodities, and/or the like. The trade facilitation services may include services relating to logistics, insurance, and finance offerings, and/or the like.

In some embodiments, the systems and methods disclosed herein comprise computer-implemented Dynamic Product Offerings (DPOs) as new market making instruments which provide an automated matching-mechanism to match product offerings offered by product suppliers and service providers with the required products the customers are looking for. This matching mechanism is designed to meet the needs of the participants based on the characteristics of the markets that the participants are participating in and the characteristics of their transactions duly optimizing the target return and expected risk from the transaction.

For example, certain entities can leverage the high-quality dynamic information and the entity performance indicators and risk profiles of the customers to design competitively priced Dynamic Product Offerings (DPOs) with suitable terms and conditions. The Product Suppliers and Service Providers can also incorporate economic and commercial promotion incentives within these new instruments (DPOs). As an example, countries, regional and global economic development organizations such as import/export banks can provide additional economic incentives in the form of guarantees to spur targeted economic growth. These measures can include the promotion of trade financing within special market segments, under-developed geographical regions, groups of nations, economic zones, or tariff-free zones.

FIG. 1 is flowchart of a system 100 and illustrates a method 500 according to the principles of the present disclosure. In some implementations, method 500 may include a digital platform or one of its components, that generates a new Dynamic Product Offering (DPO), where a participant (e.g., an entity, such as a product provider) can utilize the steps from 1.0 to 12.0 to identify market needs, devise and/or refine the new Dynamic Product Offering (DPO), manage DPO performance, and/or the like. The digital platform, or one of its components, may perform one or more steps described below.

The method 500 includes a plurality of steps organized into three categories or "swim lanes." Steps 1.0 to 12.0 are organized under three swim-lanes 502, 504, 506 depicting the life cycle of a DPO.

Using steps 1.0 to 4.0 within first swim-lane 502, an entity selling a product can analyze participants' performance and risk profiles, analyze market characteristics, study and identify market gaps in product offerings by leveraging Big Data and BI (Business Intelligence) Analytics.

Step 508 includes analyzing participants' performance and risk profiles. This step may be performed automatically or using BI Analytics tools and dashboards via artificial intelligence and based on objective performance indicators associated with the participant.

Step 510 includes analyzing market characteristics. This step may also be performed automatically or using BI Analytics tools and dashboards via artificial intelligence and objective performance indicators.

Step 512 includes studying market gaps and economic incentives for product offerings. This step may also be performed automatically or using BI Analytics tools and dashboards via artificial intelligence and objective performance indicators.

Step 514 includes leveraging big data and BI analytics to conduct market research and gain insights into product and service offerings gaps. This step may also be performed automatically or using BI Analytics tools and dashboards via artificial intelligence and objective performance indicators.

The second swim lane 504, includes steps 5.0 to 8.0 of FIG. 1, is directed to devising new Dynamic Product Offerings (DPOs). Step 516 includes analyzing and identifying the patterns of performance indicators and risk profiles of participants using an objective score, such as an AxioScore™, and characteristics of their transactions and markets they operate. This analysis can be performed automatically based on objective criteria.

Step 518 includes analyzing and identifying the pre-qualification criteria of DPO 116 for targeted markets and participants. This step may be performed automatically.

Step 520 includes optimizing the financial return and risk of the new product and service offering through DPO 116 for each entity and functional domain. This step may be performed automatically.

Step 522 includes utilizing the online trading platform to release the DPO 116 as new market instruments within the targeted markets to the targeted customers.

The third swim lane 506 includes Steps 9.0 to 12.0 of FIG. 1, and includes the category Manage Dynamic Product Offerings. Step 524 includes automating matching of the products and services with the customer and market needs. Step 526 includes helping assess the performance of the DPO 116 in the marketplace. Step 528 includes refining the pre-qualification criteria for maximizing the market acceptance of the DPOs. In some embodiments, the digital platform (or one of its components) may automatically perform one or more actions to refine DPO 116. For example, the digital platform may automatically adjust a discount to DPO 116 (e.g., based on detecting that DPO 116 is not performing well on the market), implement a new advertising campaign, and/or any other refinement capable of improving the commercial viability of DPO 116.

Step 530 includes optimizing risk and return, and continually monitoring market conditions to fine tune the DPO criteria. These steps may be performed automatically.

By determining the target reward and the expected risk for the new product offering based on the identified criteria, the digital platform or one of its designated components, reduces or eliminates human subjectivity by providing participants with an objective value to consider when determining whether to engage in particular transactions. Additionally, the digital platform conserves resources (e.g., computing resources, network resources, memory resources, and/or the like) that would otherwise be wasted by user devices to display sub-optimal product offerings provided by an inferior system (e.g., where the product offerings are based on subjective data) producing lower conversion ratios.

Figure 2:
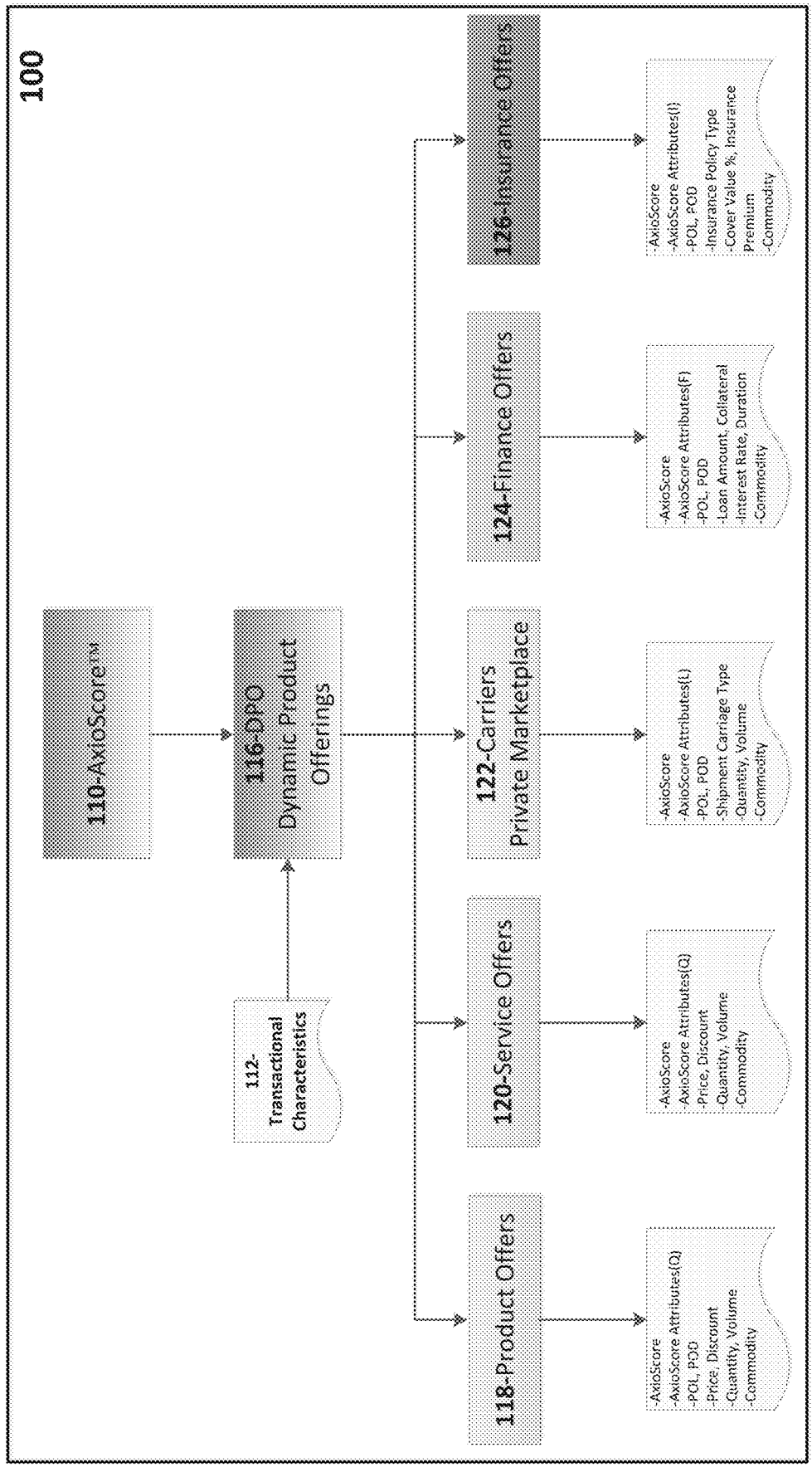
FIG. 2 is a flow diagram illustrating a dynamic product offerings method according to the principles of the present disclosure.

FIG. 2 is a diagram illustrating the system 100 used with the method 500 of providing dynamic product offerings according to the principles of the present disclosure. FIG. 2 provides illustrative examples of various types of Dynamic Product Offerings in the area of online e-Commerce, e-Finance, e-Insurance, e-Logistics, and/or the like.

FIG. 2 provides an illustrative data flow diagram indicating an overall performance score 110 (e.g., AxioScore™, an aggregated objective score, and/or the like), as well as the relevant Attribute level AxioScores, of the participants and characteristics 112 of the market and transactions as inputs in the design of Dynamic Product Offerings (DPO) 116. DPO 116 can, for example, be in multiple forms, as shown at the bottom of FIG. 2.

AxioScore™ is a weighted average aggregate of underlying attribute level AxioScores whose weights are determined by prioritization based on the relevant industry standards. While an aggregated AxioScore™ represents a multi-dimensional objective measure of entity performance and risk profile of the entities, each of the individual attribute level AxioScores represents a critical aspect of entity performance and risk area. It utilizes Artificial Intelligence and Big Data Analytics to process the minimally required transactional (e.g., Universal Data Elements (UDEs)) to efficiently process transactions that have been dynamically validated by multiple parties creating Ultimate Data Quality (UDQ).

The system 100 can be embodied in a digital platform or one of its components to devise, refine, and/or offer new market instruments (DPOs) for various products. The DPOs can also be offered in an online Carriers Private Marketplace through an integrated e-Logistics and e-Commerce platform. Financial Institutions and Insurance Companies can also devise DPOs for trade financing, cargo insurance, business owners' insurance, and trade credit insurance using an integrated digital platform encompassing e-Finance, e-Insurance, e-Commerce, and e-Logistics suite of apps.

The digital platform or one of its components can be used to provide DPO 116 in the form of Product Offers 118, Service Offers 120, Carriers Offers 122, Finance Offers 124, and Insurance Offers 126. It will be appreciated that other types of offers may also be provided. The DPO 116 can include pre-defined entity performance and risk profiles (such as the AxioScore™ 110), and characteristics 112 that are associated with the market and/or market transactions. The entity performance and risk profiles can include relevant range of values for the AxioScores 110 which encompass AxioScore Attributes, and AxioScore Factors in the computation of the AxioScores 110.

The characteristics 112 can include Point of Loading (POL), Point of Discharge (POD), Product, or Commodity Type, and/or the like. The product 118 and service 120 offerings can pre-qualify and offer the potential customers with the price discounts, attractive interest rates on the trade financing loans, best premiums for the cargo, trade credit or business insurance policies, price discounts for the carrier services or for the logistics services from the Logistics Service Providers etc.

As described in further detail below, details of reference implementation of the system 100 and DPO are provided as embodied as part of various marketplaces including but not limited to the areas of online e-Commerce, e-Logistics, e-Insurance, and e-Finance.

The examples, provided hereunder, include user and system interaction flow diagrams, tabulation of detailed steps of interaction between the computer system and interacting users. Each step is performed by a user or system role identified in the table, depending on the transaction and entity process area of operation. The reference implementation provides an illustrative example of entity usage of DPO innovation in each entity process area contained in the detailed user system interaction flow diagram, tabulation of interaction steps, and illustration of how each step has been implemented in the system by reference to the Figures that depict an example implementation of each step. The entity process area examples, in each of the below sub-sections cover e-Commerce, e-Logistics, e-Insurance, and e-Finance in that order.

Figure 3:
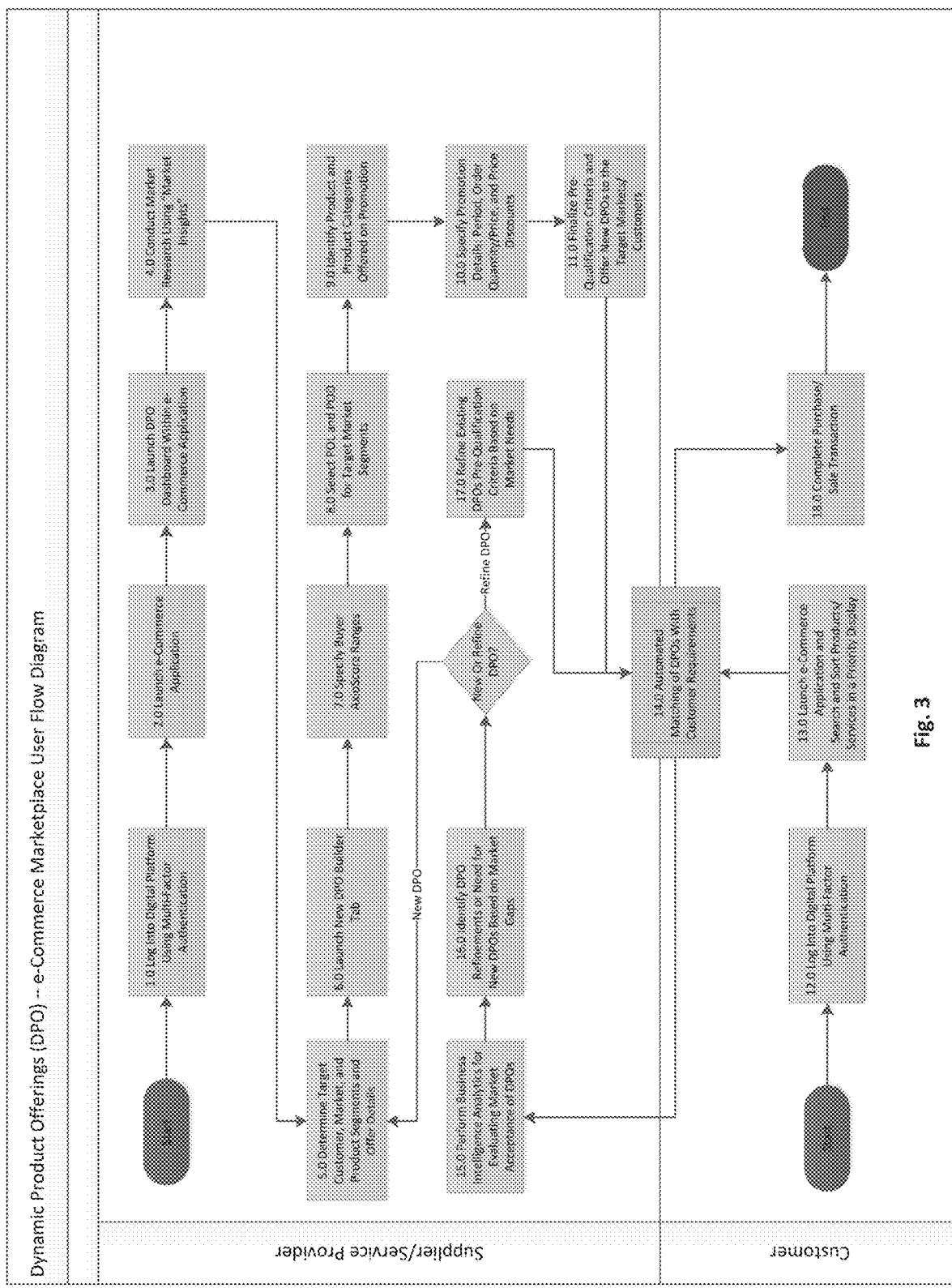
FIG. 3 is a user-flow diagram of a dynamic product offering in an e-commerce marketplace.

FIG. 3 illustrates user and system interaction for an e-Commerce Marketplace DPO. A user flow diagram depicting various system and user interaction steps is shown in FIG. 3, and each system and user interaction step in the diagram is further elaborated below with reference to steps 1.0, 2.0, etc. of FIG. 3. The step-by-step detailed system implementation of this invention for e-Commerce is depicted through a series of relevant User Interface screens referred to each step.

At step 1.0, the step of "Log Into Digital Platform Using Multi-Factor Authentication" may occur. (See FIG. 4). At Step 1.0, Product Supplier or Service Provider who are planning to sell their products and services log into Digital platform using multi-factor authentication.

Figure 5:
FIG. 5 is an e-Commerce platform U-grid.

At Step 2.0, the step of "Launch e-Commence Application" may occur (See FIG. 5). At step 2.0, Product Supplier or Service Provider launches e-Commerce Platform (A), and e-Commerce Application (B) AxioMark® that embodies Dynamic Product Offerings for Products and Services.

Figure 6:
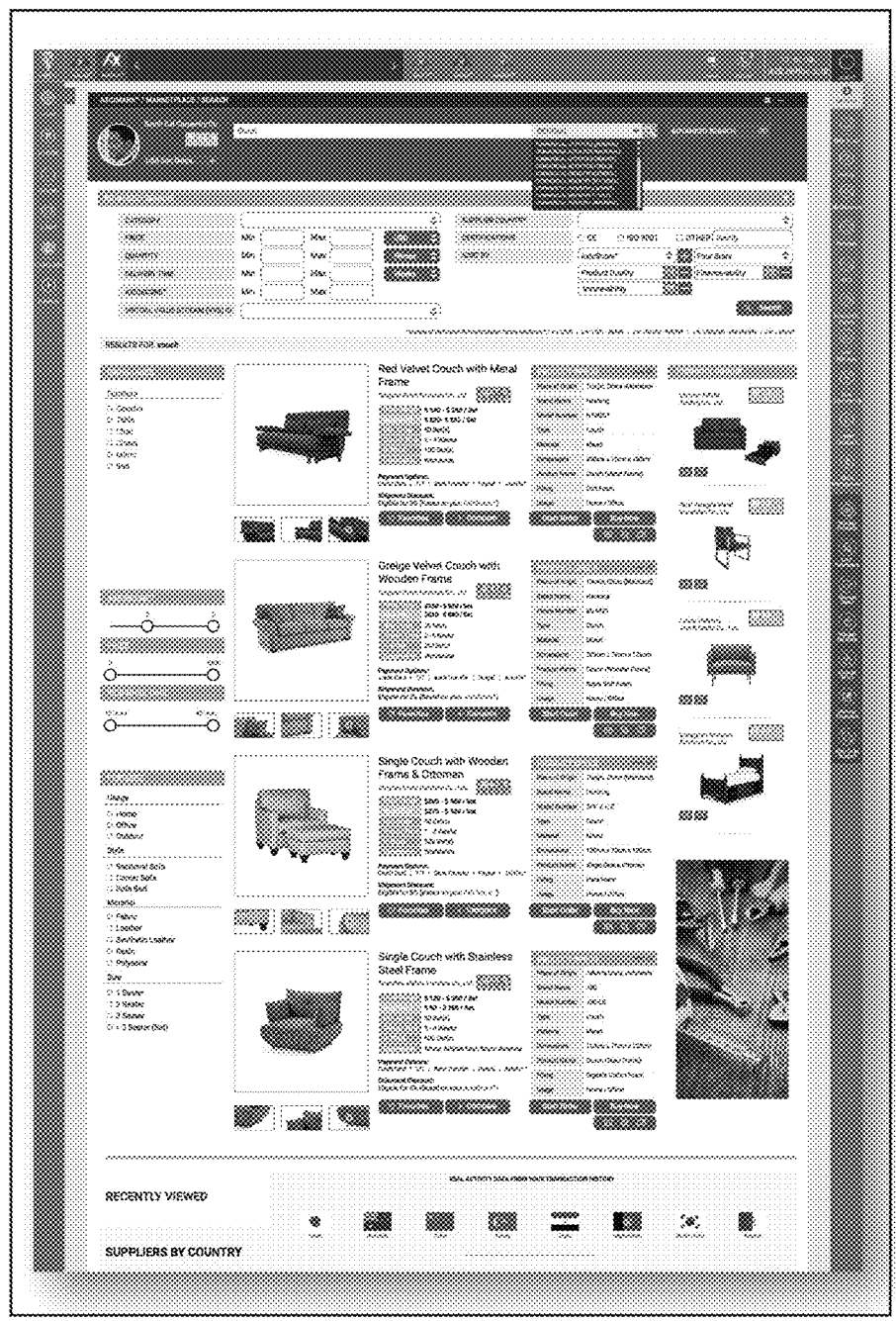
FIG. 6 is an illustration of a user interface for an e-commerce platform.

At step 3.0, the step of "Launch DPO Dashboard within e-Commerce Platform" may occur (See FIG. 6). At step 3.0, Seller launches DPO Dashboard by clicking on a Graphical User Interface (GUI) accessible from within the e-Commerce Platform.

Figure 7:
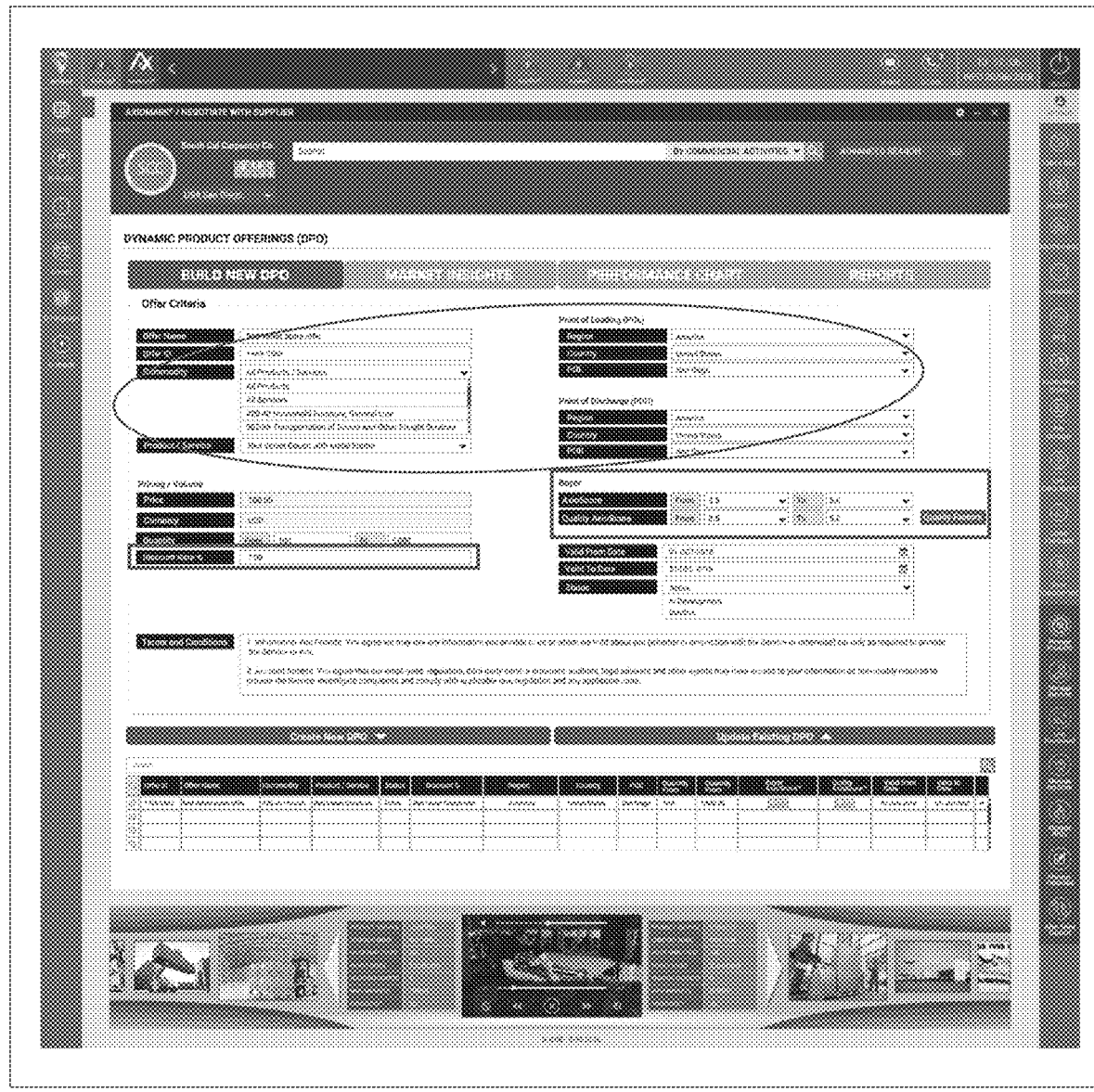
FIG. 7 generally illustrates a user interface for managing dynamic product offerings for products according to the principles of the present disclosure.

At step 4.0, the step of "Conduct Market Research Using Market Insights" may occur (See FIG. 7). At step 4.0, using "MARKET INSIGHTS" tab of the DPO dashboard, Product Supplier and Service Providers can conduct market research by using Business Intelligence Analytical Capability of the DPO Dashboard to gain market insights.

At step 5.0, the step of "Determine Target Customer, Market, and Product Segments and Offer Details" may occur (See FIG. 7). At step 5.0, based on the analysis conducted in Step 4, Product Suppliers and Service Providers determine New DPO parameters targeting customer, market, and product segments and details of promotional offers.

At step 6.0, the step of "Launch New DPO Builder Tab" may occur (See FIG. 7). At step 6.0, Seller launches the New DPO Builder by clicking on the "BUILD NEW DPO" tab.

At step 7.0, the step of "Specify Buyer AxioScore Ranges" may occur (See FIG. 7). At step 7.0, Supplier/Service Provider will start populating DPO pre-qualification criteria by specifying AxioScore Ranges of potential buyers.

At step 8.0, the step of "Select POL and POD for Target Market Segments" may occur (See FIG. 7). At step 8.0, Target Geographical Market segments are specified by selecting Point of Loading, Point of Discharge of the transaction.

At step 9.0, the step of "Identify Product and Product Categories Offered on Promotion" may occur (See FIG. 7). At step 9.0, The product and product categories that are offered on promotion are specified using new DPO builder Screen.

At step 10.0, the step of "Specify Promotion Details: Period, Order Quantity/Price, and Price Discounts" may occur (See FIG. 7). At step 10.0, The promotion details are specified indicating the dates for the time period of promotion, order quantity and total order price, and price discounts offered as part of a promotion.

At step 11.0, the step of "Finalize Pre-Qualification Criteria and Offer New DPOs to the Target Markets/Customers" may occur (See FIG. 7). At step 11.0, All DPO pre-qualification criteria are established, and DPOs are saved clicking on "Create New DPO" button. The new DPOs are released to the marketplace by activating newly created DPOs by changing their status to "Active".

Figure 4:
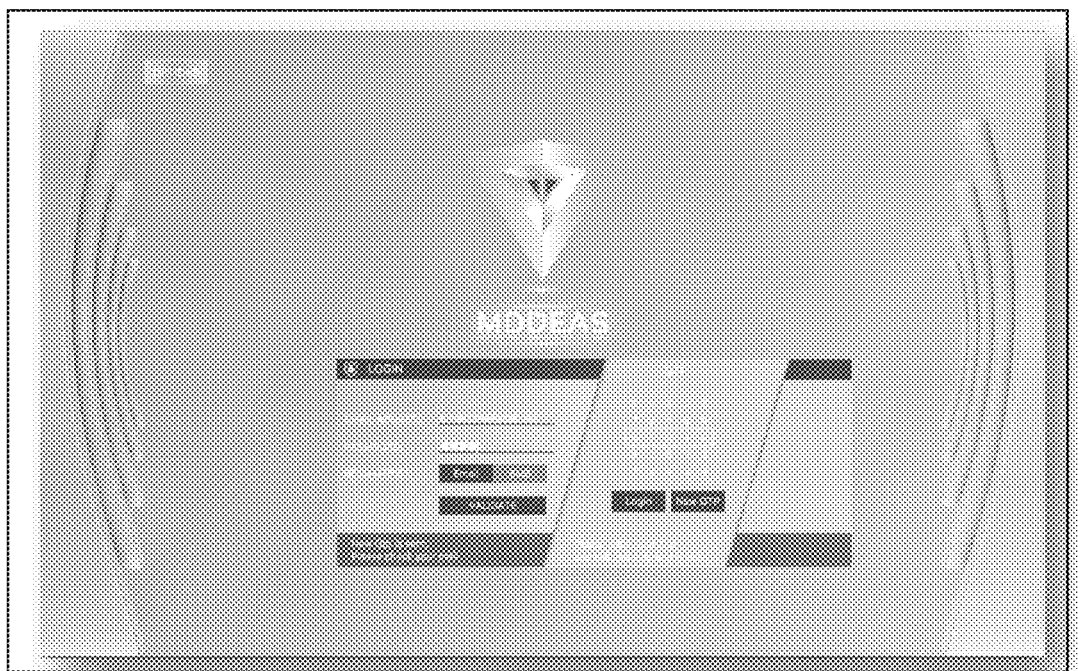
FIG. 4 is a multi-factor user authentication screen.

At step 12.0, the step of "Log Into Digital Platform Using Multi-Factor Authentication" may occur (See FIG. 4). At step 12.0, Customer logs into online Digital platform using multi-factor authentication mechanism.

At step 13.0, the step of "Search and Sort Products/Services in a Priority Display" may occur. (See FIGS. 5 and 6). At step 13.0, Customer launches e-Commerce Platform AxioMark and e-Commerce Application to search and select products and services by using Advanced Search Criteria.

Figure 8:
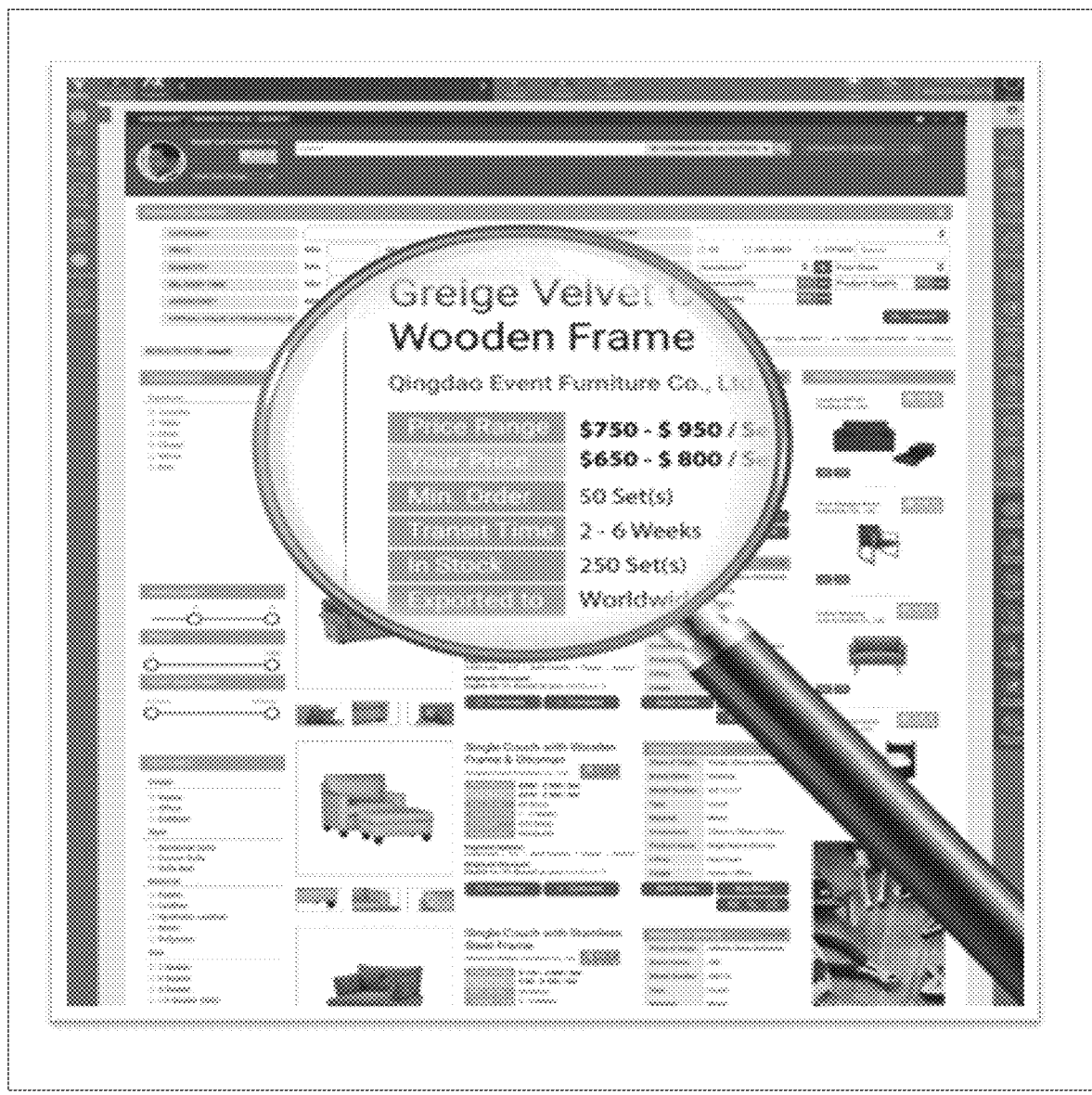
FIG. 8 illustrates a customer-tailored price through an e-Commerce dynamic product offering matched with the customer profile.

At step 14.0, the step of "Automated Matching With Customer Requirements" may occur (See FIG. 8). At step 14.0, The product and service search results show "Your Price" which is a custom-tailored price based on the automated match between the buyer profile and DPO pre-qualification criteria.

At step 15.0, the step of "Perform Business Intelligence Analytics for Evaluating Market Acceptance of DPOs" may occur (See FIG. 7). At step 15.0, Using DPO Dashboard's "Performance Chart" tab, the product supplier or the service providers evaluate the performance and effectiveness of their DPOs in terms of their market acceptance. The performance charts and reports can be saved and shared with other team members and can be re-launched from the "Reports" tab of DPO Dashboard.

At step 16.0, the step of "Identify DPO Refinements or Need for New DPOs Based on Market Gaps" may occur (See FIG. 7). At step 16.0, Supplier can identify refinements to current DPO pre-qualification criteria or identify need for new DPOs by conducting market research and identifying market gaps.

Additionally, the product supplier of service supplier may determine whether a new of refined DPO should occur. Supplier/Service Provider performs cost-benefit analysis to determine the need for either building new DPOs or making refinements to the existing DPOs.

At step 17.0, the step of "Refine Existing DPOs Pre-Qualification Criteria Based on Market Needs" may occur (See FIG. 7). At step 17.0, if the business decision is to refine the existing DPOs, appropriate modifications are made to the pre-qualification criteria of existing DPOs and re-offered to the marketplace.

Figure 9:
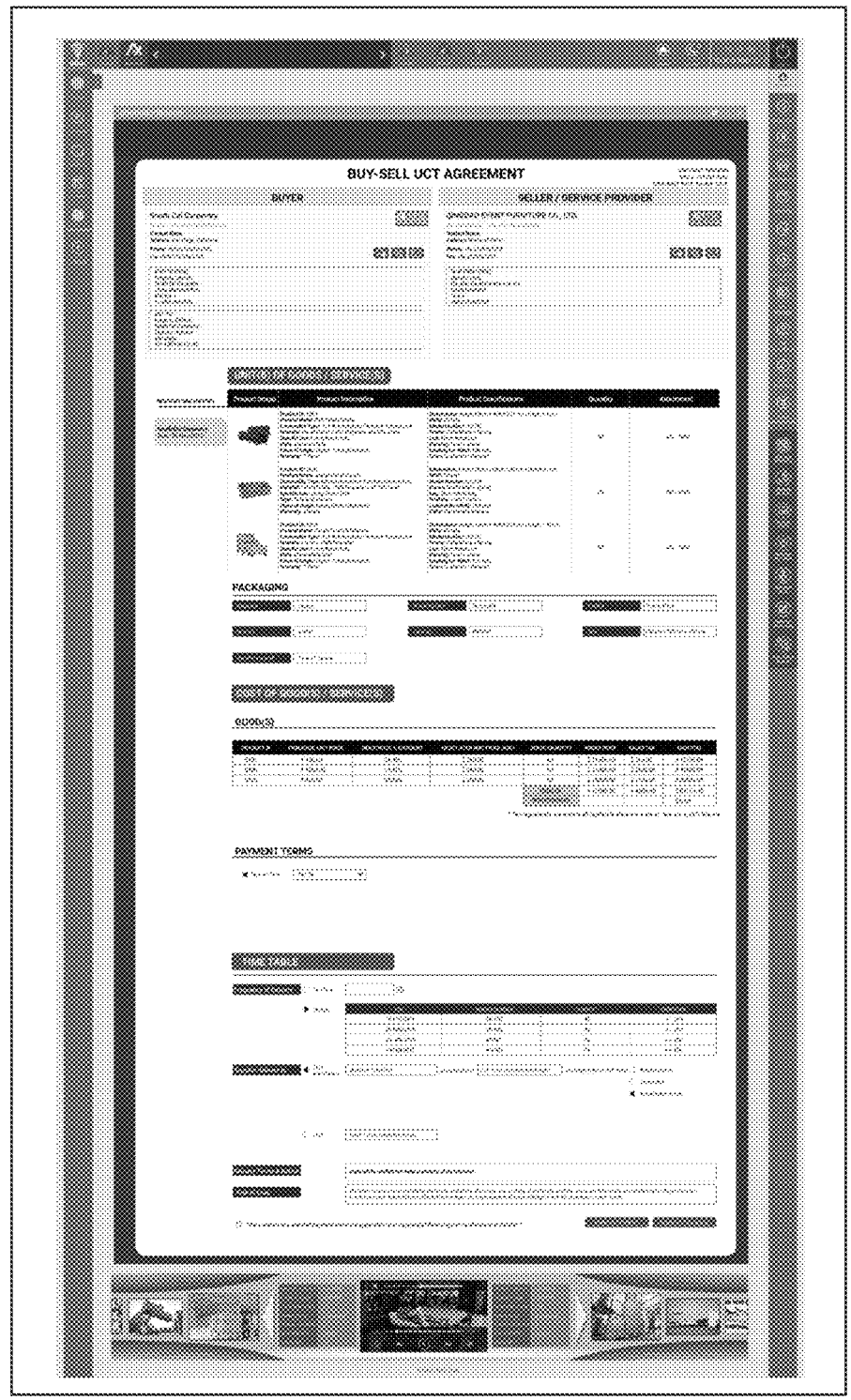
FIG. 9 illustrates an e-Commerce buy-sell agreement.

At step 18.0, the step of "Complete Purchase/Sale Transaction" may occur (See FIG. 9). At step 18.0, Buyers and Sellers complete purchase/sale transaction by entering into a Buy Sell Agreement using Units Cost Timetable framework.

FIGS. 4-9 illustrate interfaces for use with the above DPOs for e-Commerce products. FIG. 4 illustrates a multi-factor user authentication to MDDEAS® platform. FIG. 5 illustrates the launch of e-Commerce Application AxioMark® in e-Commerce Platform AxioMark U-grid. FIG. 6 illustrates an AxioMark® e-Commerce Platform.

FIG. 7 generally illustrates an interface 202 for dynamic product offerings 116 for e-Commerce products according to the principles of the present disclosure. The interface 202, and other interfaces described herein, may be provided as a graphical user interface displayed on the screen of a computing device, such as a smartphone, tablet, desktop computer, laptop computer, or the like.

FIG. 7 provides Dynamic Product Offerings 116 in the area of online e-Commerce for a total price discount percentage for targeted customers with pre-defined entity performance and risk profiles as well as specific market and product segments. For example, a supplier may define a DPO having the characteristics selected at the interface 202. The supplier may define the level of the discount, the POD, the POL, the dates the offer is valid, the specific product, etc. The supplier may also define the type of customer that will qualify, for example defining the required minimum AxioScore and AxioScore™ Quality Attribute.

FIG. 7 further provides an example of the Dynamic Product Offerings 116 for the product suppliers to devise a new product offering using an online e-Commerce platform such as AxioMark®. This DPO offers dynamically personalized discounts for products and services based on the buyers' AxioScore™, Point of Loading (POL), Point of Discharge (POD), Commodity, Volume, Quantity, and total purchase amount.

FIG. 8 illustrates a customer tailored price matched through an e-Commerce DPO. FIG. 9 illustrates an AxioMark® e-Commerce Buy-Sell Agreement.

Figure 10:
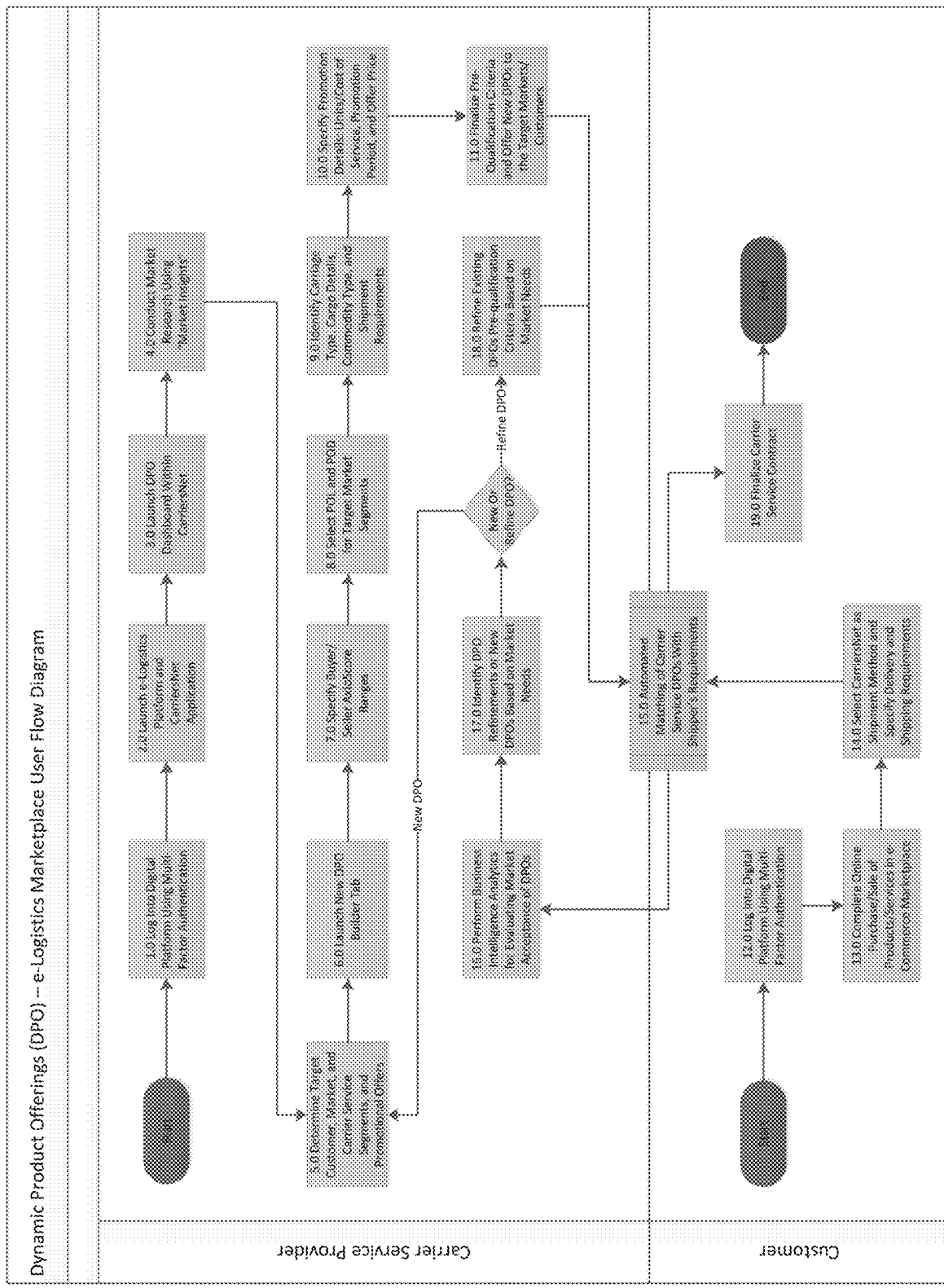
FIG. 10 is a user-flow diagram of a dynamic product offering in an e-Logistics marketplace.

Turning now to an implementation of the DPO 116 in an e-Logistics marketplace, FIG. 10 illustrates a user and system interaction for an e-Logistics CarriersNet Marketplace DPO. This section illustrates an example of usage of the system 100 in an online e-Logistics platform. A user flow diagram depicting various system and user interaction steps is shown in FIG. 10, and each system and user interaction step in the diagram is further elaborated below, with reference to the steps 1.0, 2.0, 3.0, etc. The step-by-step detailed system implementation of this invention for e-Logistics using CarriersNet App is further depicted through a series of relevant User Interface screens related to the various described steps.

At step 1.0, the step of "Log Into Digital Platform Using Multi-Factor Authentication" may occur (See FIG. 4). At step 1.0, Carrier or Logistics Service Provider Logs into Digital platform using multi-factor authentication.

Figure 11:
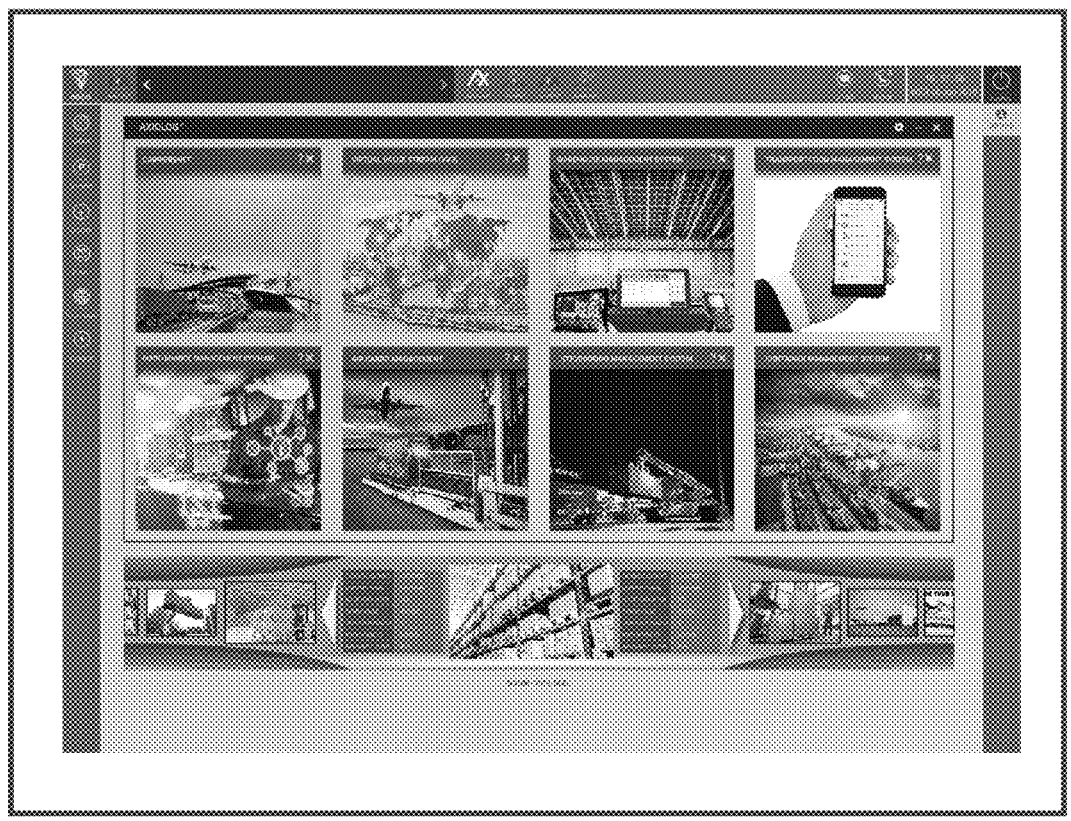
FIG. 11 is an e-Logistics platform U-grid.

At step 2.0, the step of "Launch e-Logistics Platform and CarriersNet Application" may occur (See FIG. 11). At step 2.0, Carrier or Logistics Service Provider launches e-Logistics Platform (A), and CarriersNet (B) that provides Graphical User Interface (GUI) access to launch DPO Dashboard.

Figure 12:
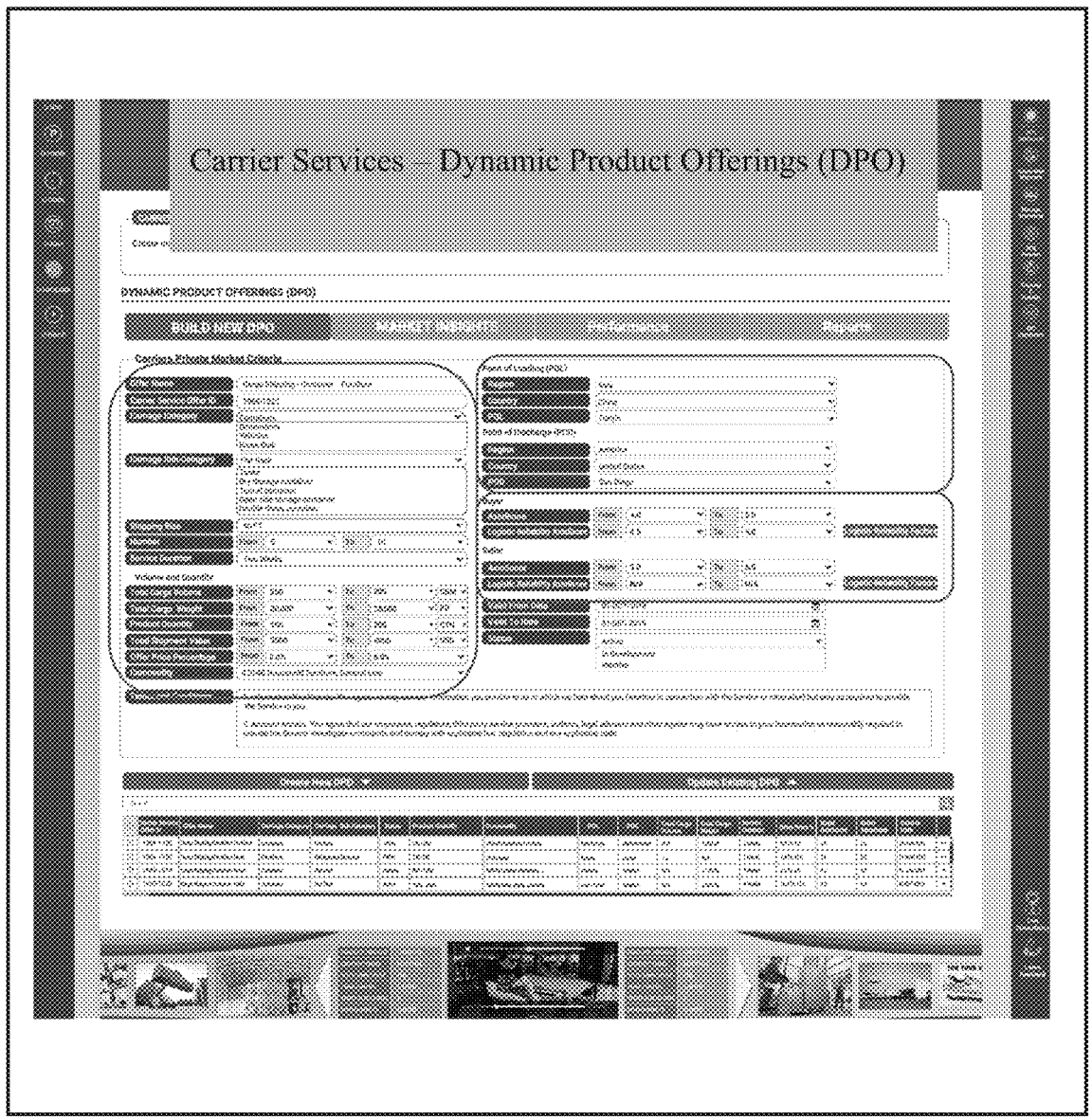
FIG. 12 generally illustrates an interface for dynamic product offerings for e-Logistics according to the principles of the present disclosure.

At step 3.0, the step of "Launch DPO Dashboard Within CarriersNet" may occur (See FIG. 12). At step 3.0, Carrier or Logistics Service Provider launches DPO Dashboard by clicking on a Graphical User Interface (GUI) accessible from within CarriersNet Application.

At step 4.0, the step of "Conduct Market Research Using Market Insights" may occur (See FIG. 12). At step 4.0, Using "MARKET INSIGHTS" tab of DPO dashboard, the Service Providers can conduct market research by using Business Intelligence Analytical Capability of DPO Dashboard to gain market insights.

At step 5.0, the step of "Determine Target Customer, Market, and Carrier Service Segments and Promotional Offers" may occur (See FIG. 12). At step 5.0, based on the analysis conducted in Step 4, Service Providers determine new DPO parameters targeting Customer, Market, and Carrier Service segments and details of promotional offers.

At step 6.0, the step of "Launch New DPO Builder Tab" may occur (See FIG. 12). At step 6.0, Service Provider launches New DPO Builder by clicking on "BUILD NEW DPO" tab.

At step 7.0, the step of "Specify Buyer/Seller AxioScore Ranges" may occur (See FIG. 12). At step 7.0, Service Provider will start populating DPO pre-qualification criteria by specifying AxioScore Ranges of target buyers and sellers.

At step 8.0, the step of "Select POL and POD for Target Market Segments" may occur (See FIG. 12). At step 8.0, Target Geographical Market segments are specified by selecting Point of Loading, and Point of Discharge of the transaction.

At step 9.0, the step of "Identify Carriage Type, Cargo Details, Commodity Type, and Shipment Requirements" may occur (See FIG. 12). At step 9.0, The end-to-end Carrier Service for each service offering requires specification of several parameters including Carriage category and sub-category, Commodity type, Cargo details such as Volume, Quantity, and Dimensions, and determine the offer price and offer details.

At step 10.0, the step of "Specify Promotion Details: Units/Cost of Service, Promotion Period, and Offer Price" may occur (See FIG. 12). At step 10.0, The promotion details are specified indicating the dates for the time period of promotion, Units, Cost, and Timetable, offer price and price discounts as part of promotion.

At step 11.0, the step of "Finalize Pre-Qualification Criteria and Offer New DPOs to the Target Markets/Customers" may occur (See FIG. 12). At step 11.0, All DPO pre-qualification criteria are established, and DPOs are saved by clicking on "Create New DPO" button. The new DPOs are released to the marketplace by activating newly created DPOs by changing their status to "Active".

At step 12.0, the step of "Log Into Digital Platform Using Multi-Factor Authentication" may occur (See FIG. 4). At step 12.0, Customer, either the buyer or seller log into Digital online e-Commerce platform using appropriate security mechanism.

At step 13.0, the step of "Complete Online Purchase/Sale of Products/Services in e-Commerce Marketplace" may occur (See FIG. 9). At step 13.0, the Buyer/Seller complete purchase/sale transaction of products and services by entering into a preliminary Buy Sell Agreement using the Unit Cost Timetable (UCT) framework.

At step 14.0, the step of "Select CarriersNet as Shipment Method and Specify Delivery and Shipping Requirements" may occur. At step 14.0, The Buyer/Seller will launch CarriersNet Application and Specify Delivery and Shipping Requirements and submit for getting pre-qualified Carrier Service Offers.

Figure 13:
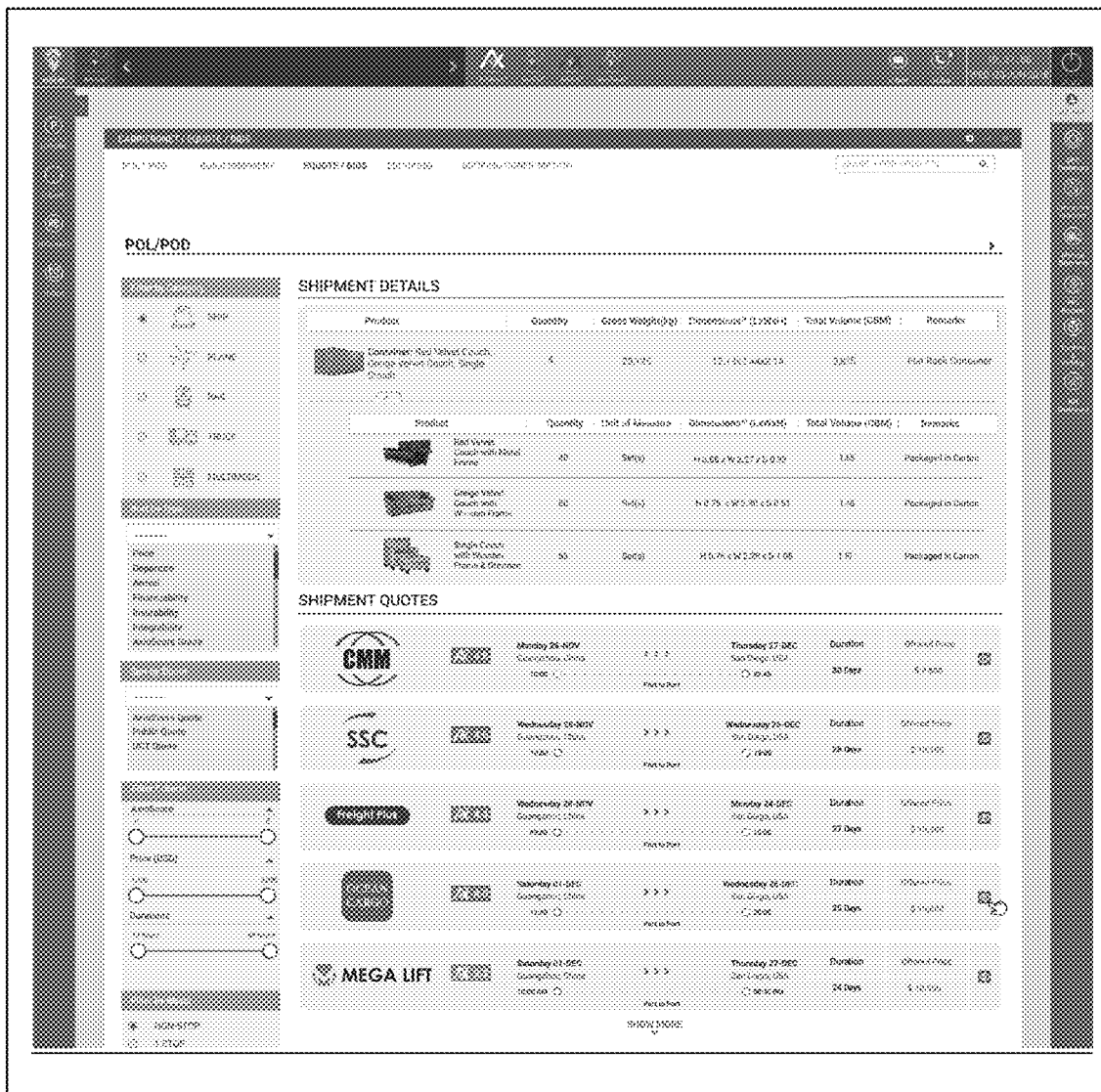
FIG. 13 illustrates shipment e-quotes through dynamic product offerings for e-Logistics.

At step 15.0, the step of "Automated Matching of Carrier Service DPOs With Shipper's Requirements" may occur (See FIG. 13). At step 15.0, The e-Logistics Platform CarriersNet App will automatically match Customer's Shipping Service Requirements with the pre-qualification criteria of available Carrier Service DPOs and present a list of matching Pre-qualified Service Offers.

At step 16.0, the step of "Perform Business Intelligence Analytics for Evaluating Market Acceptance of DPOs" may occur (See FIG. 12). At step 16.0, Using DPO Dashboard's "Performance" tab, the Carrier Service Providers can evaluate the performance and effectiveness of their DPOs in the marketplace. The evaluation reports can be saved and shared with other team members and can be re-launched from the "Reports" tab of DPO Dashboard.

At step 17.0, the step of "Identify DPO Refinements or Need for New DPOs Based on Market Needs" may occur. At step 17.0, Service Providers can identify refinements to current DPO pre-qualification criteria or identify need for new DPOs by conducting market research and identifying market gaps.

Also, the carrier or logistics service provider may determine whether a new or refined DPO is desired. The Carrier or Logistics Service Provider performs cost-benefit analysis to determine the need for either building new DPOs or making refinements to the existing DPOs.

At step 18.0, the step of "Refine Existing DPOs Pre-Qualification Criteria Based on Market Needs" may occur (See FIG. 12). At step 18.0, If the business decision is to refine the existing DPOs, appropriate modifications are made to the pre-qualification criteria of existing DPOs and re-offered to the marketplace.

Figure 14:
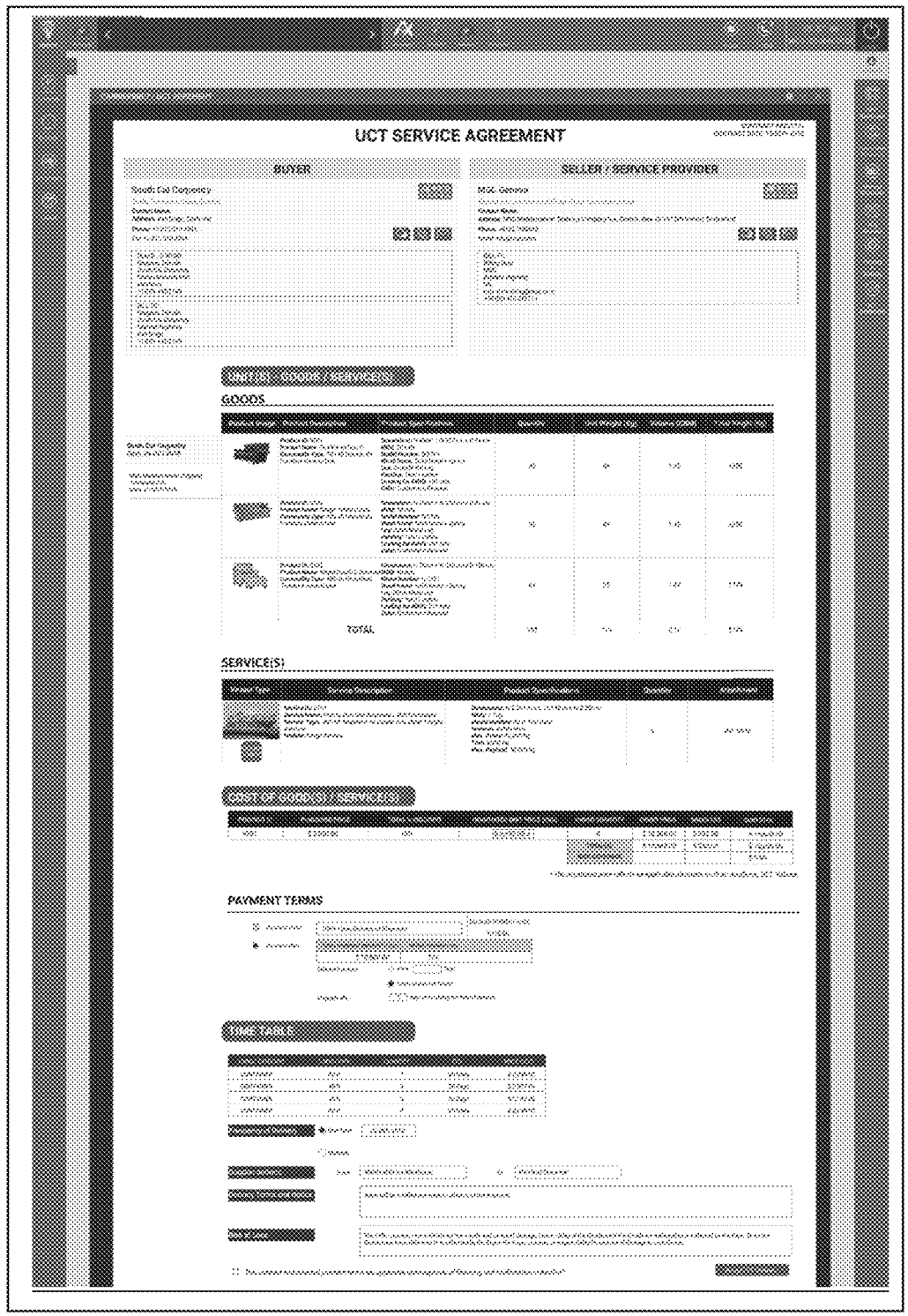
FIG. 14 illustrates a carrier service Unit, Cost, Timetable (UCT) agreement for e-Logistics.

At step 19.0, the step of "Finalize Carrier Service Contract" may occur (See FIG. 14). At step 19.0, Shipper and Carrier Service Provider finalize the transaction by entering into a Carrier Service Agreement using UCT (Units Cost Timetable) framework.

FIGS. 11-14 illustrates various screens and interfaces in relation to the above steps regarding e-Logistics. FIG. 11 illustrates launching of CarriersNet App in an e-Logistics platform of an AxioLog U-grid.

FIG. 12 generally illustrates an interface 204 for dynamic product offerings 116 for e-logistics according to the principles of the present disclosure. FIG. 12 provides an example of Dynamic Product Offerings 116 in the area of online e-Logistics service market with price discounts based on the entity performance and risk profiles of targeted customers and characteristics of the logistics service, shipment, route, load, and volume. Various criteria may be tailored to satisfy the requirements of the logistics provider.

FIG. 12 provides an example of a DPO 116 for a Carrier Service using online e-Logistics platform. In case of a private market network for Carrier services, the Carrier Service providers can offer their trading partners Dynamic Product Offerings (DPO) 116 with contract terms, conditions and pricing that are dynamically driven by their existing trading relationship and the entity performance/risk profile of their partners as reflected in their AxioScores. This same capability can be extended to all Logistics Service Providers.

FIG. 13 illustrates shipment e-quotes from Dynamic Product Offerings (DPO) for e-Logistics. FIG. 14 illustrates a Carrier Service UCT Agreement for e-Logistics.

Figure 15:
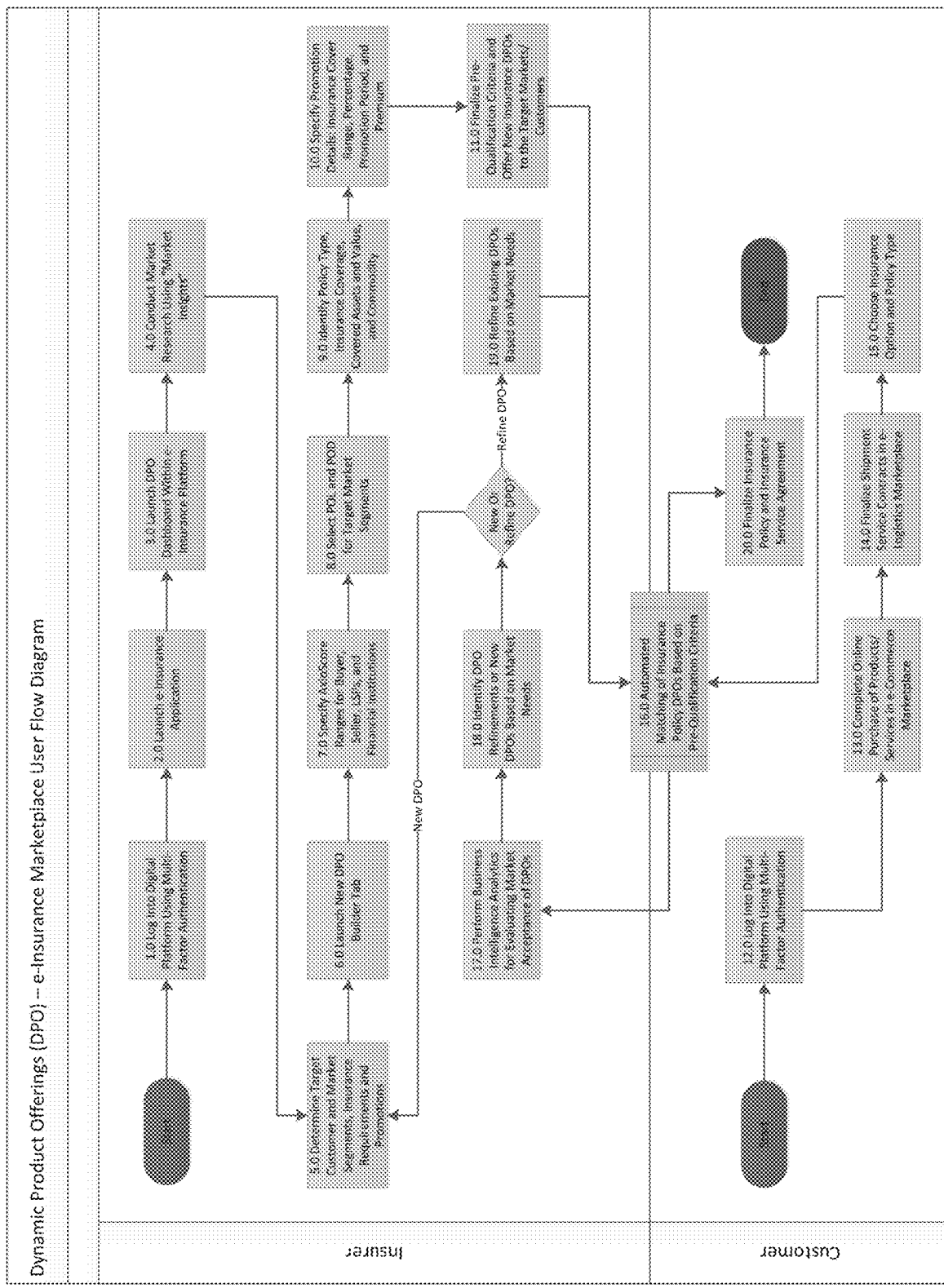
FIG. 15 is a user-flow diagram of a dynamic product offering in an e-Insurance marketplace.

With reference now to FIG. 15, an implementation of the system 100 of a DPO in e-Insurance marketplace is shown. This section illustrates an example of usage of a DPO in an online e-Insurance platform. A user flow diagram depicting various system and user interaction steps is shown in FIG. 15, and each system and user interaction step in the diagram is further elaborated below with reference to steps 1.0, 2.0, 3.0, etc. shown in FIG. 15. The step-by-step detailed system implementation of this invention for e-Insurance platform is further depicted through a series of relevant User Interface screens shown in FIGS. 16-23.

At step 1.0, the step of "Log Into Digital Platform Using Multi-Factor Authentication" may occur (See FIG. 4). At step 1.0, Insurer or Insurance Provider Logs into Digital platform using multi-factor authentication At step 2.0, the step of "Launch e-Insurance Application" may occur (See FIGS. 16 and 17). At step 2.0, Insurance Service Provider launches e-Insurance Platform and launches e-Insurance Application, AxioIn that provides Graphical User Interface (GUI) access to launch DPO Dashboard.

Insurer completes additional authentication required to log into AxioIn Insurer Landing Page.

Figure 18:
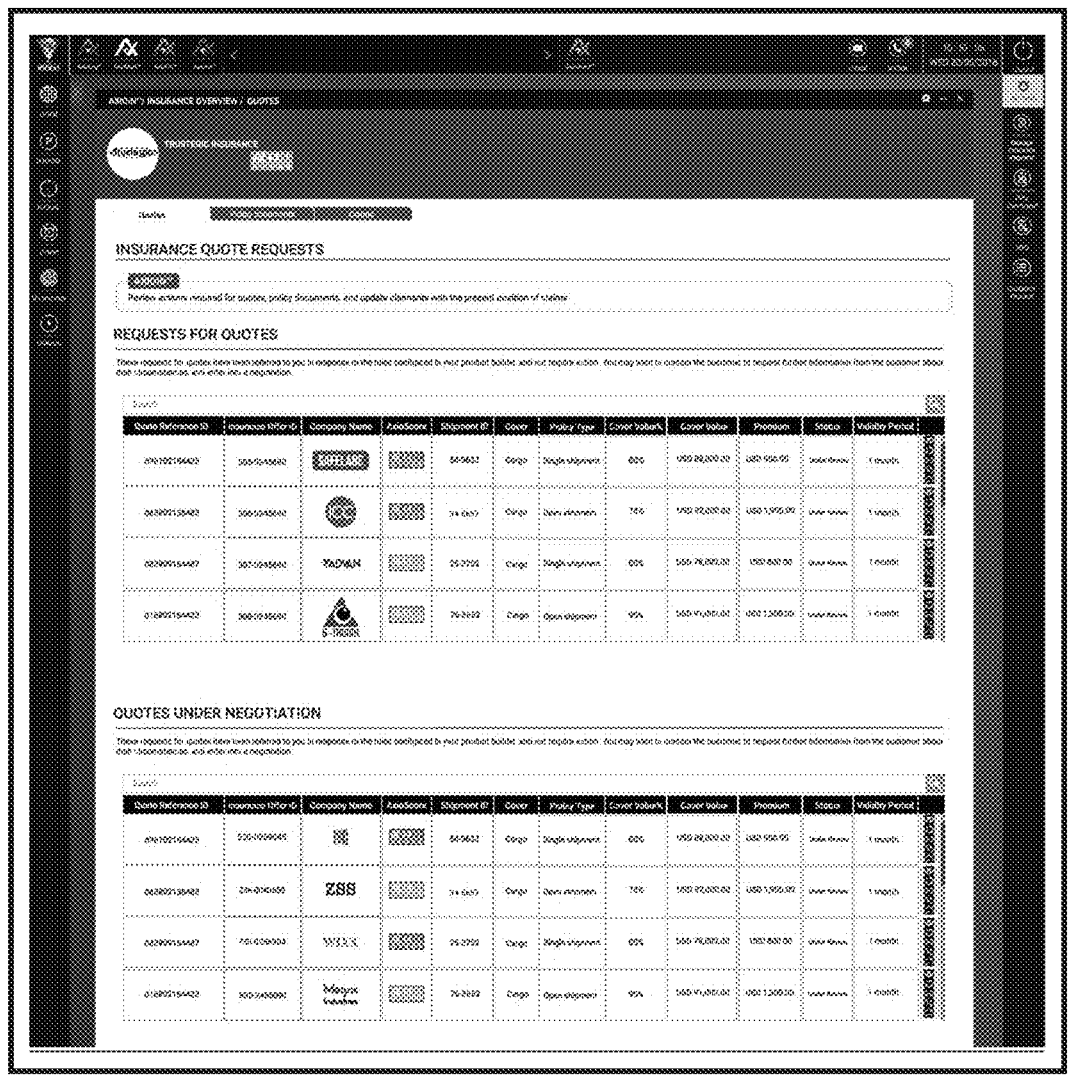
FIG. 18 is an insurer landing page for an e-Insurance platform.

At step 3.0, the step of "Launch DPO Dashboard Within e-Insurance Platform" may occur (See FIG. 18). At step 3.0, Insurance Service Provider launches DPO Dashboard by clicking on "DPO Dashboard" icon on the right-side bar from within AxioIn Application.

Figure 19:
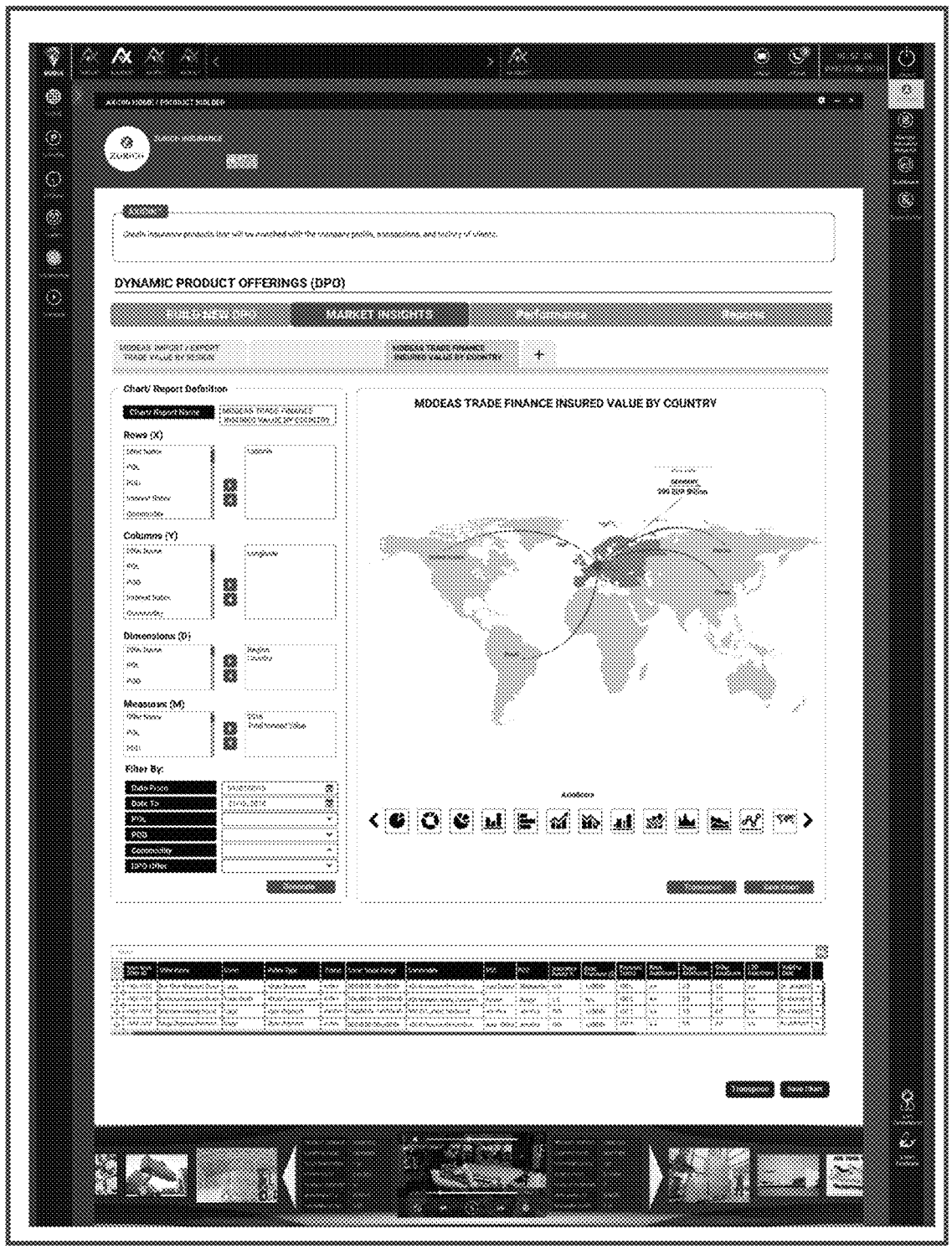
FIG. 19 generally illustrates a dashboard interface illustrating market research for dynamic product offerings for e-Insurance according to the principles of the present disclosure.

At step 4.0, the step of "Conduct Market Research Using Market Insights" may occur (See FIG. 19). At step 4.0, Using "MARKET INSIGHTS" tab of DPO dashboard, the Service Providers can conduct market research by using Business Intelligence Analytical Capability of DPO Dashboard to gain market insights such as by country e.g. Germany.

At step 5.0, the step of "Determine Target Customer and Market Segments, Insurance Requirements and Promotions" may occur (See FIG. 19). At step 5.0, Based on the analysis conducted in Step 4, Insurance Service Providers determine New DPO parameters targeting specific Customer, Market, and Insurance Service segments and details of promotional offers.

Figure 20:
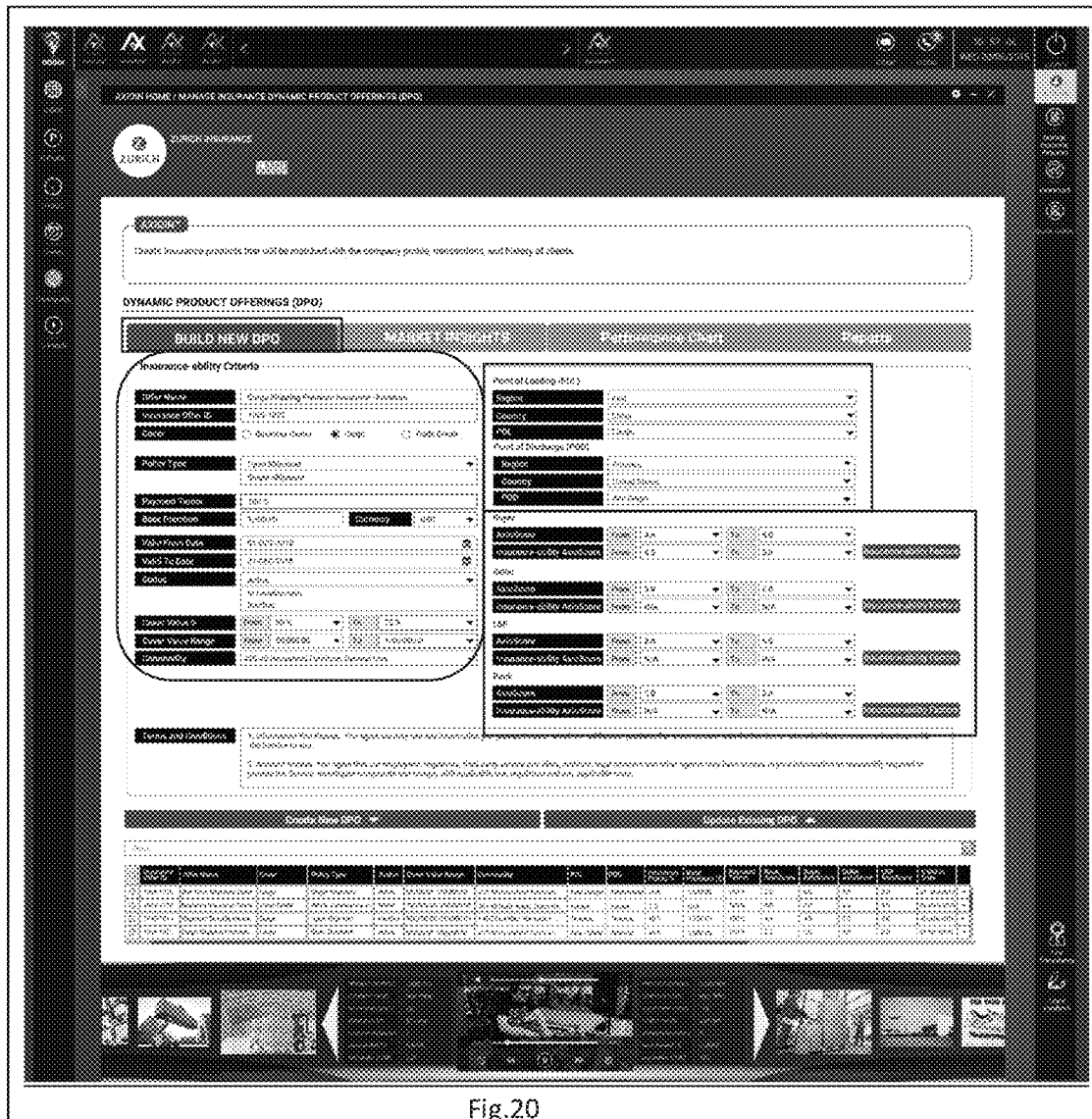
FIG. 20 generally illustrates a dashboard interface for dynamic product offerings for e-Insurance according to the principles of the present disclosure.

At step 6.0, the step of "Launch New DPO Builder Tab" may occur (See FIG. 20). At step 6.0, Insurance Service Provider launches New DPO Builder by clicking on "BUILD NEW DPO" tab.

At step 7.0, the step of "Specify AxioScore Ranges for Buyer, Seller, LSPs, and Financial Institutions" may occur (See FIG. 20). At step 7.0, Insurance Service Provider will start populating DPO pre-qualification criteria by specifying AxioScore Ranges of target buyers, sellers, LSPs, and Financial Institutions.

At step 8.0, the step of "Select POL and POD for Target Market Segments" may occur (See FIG. 20). At step 8.0, Target Geographical Market segments are specified by selecting Point of Loading, and Point of Discharge of the transaction.

At step 9.0, the step of "Identify Policy Type, Insurance Coverage, Covered Assets and Value, and Commodity" may occur (See FIG. 20). At step 9.0, The Insurance Service Provider Identifies Policy Type, Insurance Coverage provided, Covered Assets and Value Covered and Commodity types.

At step 10.0, the step of "Specify Promotion Details: Insurance Cover Range, Percentage, Promotion Period, and Premium" may occur (See FIG. 20). At step 10.0, The promotion details are specified indicating the dates for the promotional period, base premium, and insurance coverage details as part of promotion.

At step 11.0, the step of "Finalize Pre-Qualification Criteria and Offer New DPOs to the Target Markets/Customers" may occur (See FIG. 20). At step 11.0, All DPO pre-qualification criteria are established, and DPOs are saved by clicking on "Create New DPO" button. The new DPOs are released to the marketplace by activating newly created DPOs by changing their status to "Active".

At step 12.0, the step of "Log Into Digital Platform Using Multi-Factor Authentication" may occur (See FIG. 4). At step 12.0, Customer, either the buyer or seller log into online e-Commerce platform using appropriate security mechanism.

At step 13.0, the step of "Complete Online Purchase/Sale of Products/Services in e-Commerce Marketplace" may occur (See FIG. 9). At step 13.0, The Buyer/Seller complete purchase/sale transaction of products and services by entering into a preliminary Buy Sell Agreement using Units Cost Timetable framework.

At step 14.0, the step of "Finalize Shipment Service Contracts in e-Logistics Marketplace" may occur (See FIG. 14). At step 14.0, The Buyer/Seller will launch e-Logistics Application and obtain Shipment/LSP Contract based on Delivery and Shipping Requirements.

Figure 21:
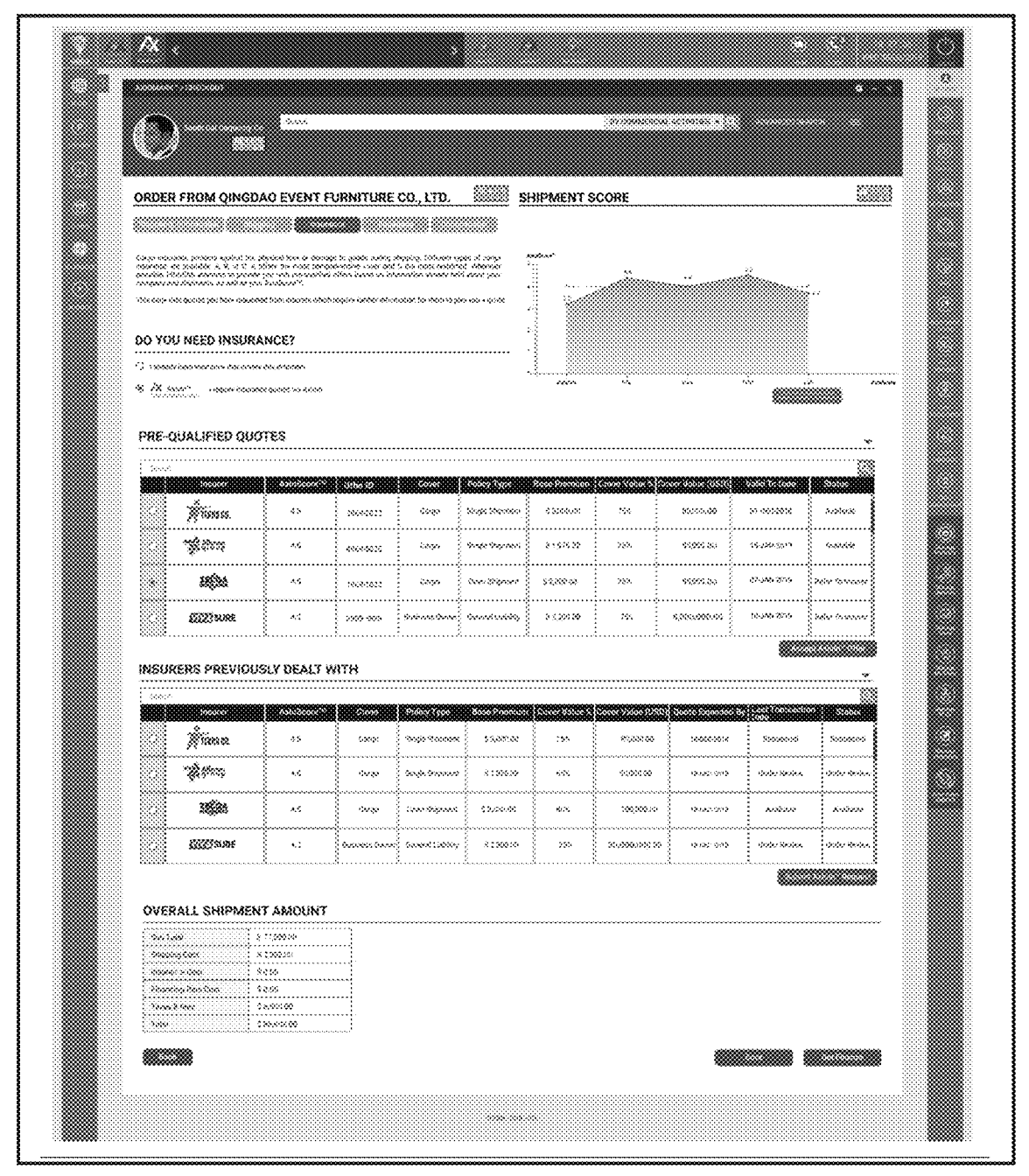

At step 15.0, the step of "Choose Insurance Option and Policy Type" may occur (See FIG. 21). At step 15.0, Upon finalization of shipment service contract, the customer will be presented with insurance choice option. When AxioFin e-Insurance option is chosen, the customer will be presented with Insurance Pre-Qualification Offers to choose from.

At step 16.0, the step of "Automated Matching of Insurance Policy DPOs Based on Pre-Qualification Criteria" may occur (See FIG. 21). At step 16.0, The e-Insurance Platform will automatically match Customer's Insurance Service Requirements with the pre-qualification criteria of available Insurance DPOs and present a list of matching Pre-qualified Insurance Quotes.

Figure 22:
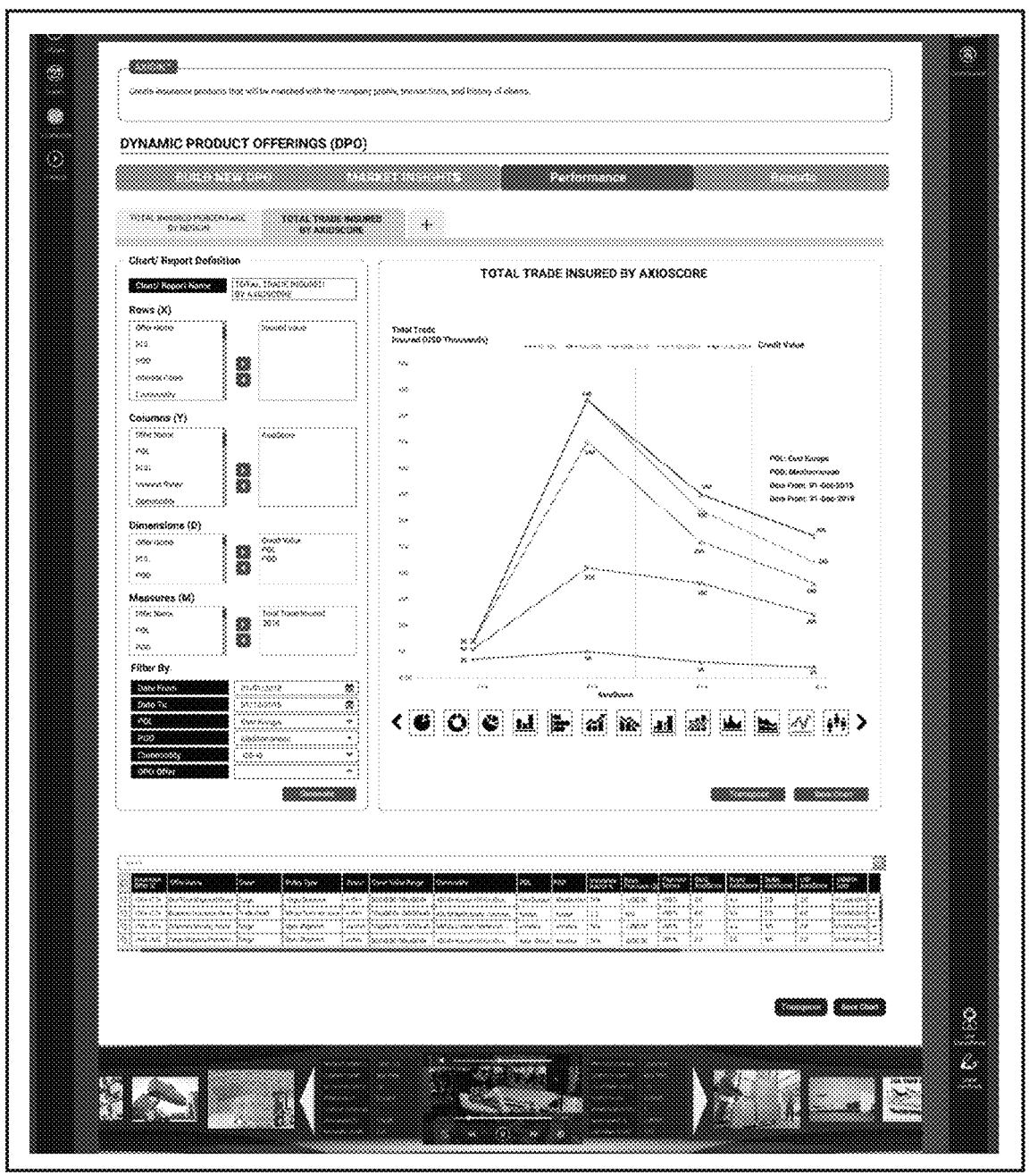
FIG. 22 illustrates an evaluation screen for evaluating market performance of a dynamic product offering for e-insurance.

At step 17.0, the step of "Perform Business Intelligence Analytics for Evaluating Market Acceptance of DPOs" may occur (See FIG. 22). At step 17.0, Using DPO Dashboard's "Performance" tab, the Insurance Service Providers can evaluate the performance and effectiveness of their DPOs in the marketplace. The evaluation reports can be saved and shared with other team members and can be re-launched from the "Reports" tab of DPO Dashboard.

At step 18.0, the step of "Identify DPO Refinements or Need for New DPOs Based on Market Needs" may occur (See FIG. 22). At step 18.0, From the above analysis, Insurance Service Providers can identify refinements to current DPO pre-qualification criteria or identify need for new DPOs by conducting market research and identifying market gaps.

Also, the insurance service provider may determine whether to create a new or refine an existing DPO. The insurance provider performs cost-benefits analysis to determine the need for either building new DPOs or making refinements to the existing DPOs.

At step 19.0, the step of "Refine Existing DPOs Based on Market Needs" may occur (See FIG. 20). At step 19.0, If the business decision is to refine the existing DPOs, appropriate modifications are made to the pre-qualification criteria of existing DPOs and re-offered to the marketplace.

Figure 23:
FIG. 23 illustrates details of an e-Insurance policy.

At step 20.0, the step of "Finalize Insurance Policy and Insurance Service Agreement" may occur (See FIG. 23). At step 20.0, Customer and Insurance Service Provider finalize the transaction by entering into an Insurance Service Agreement using UCT (Unit Cost Timetable) framework and obtain/issue a New Insurance Policy.

Figure 16:
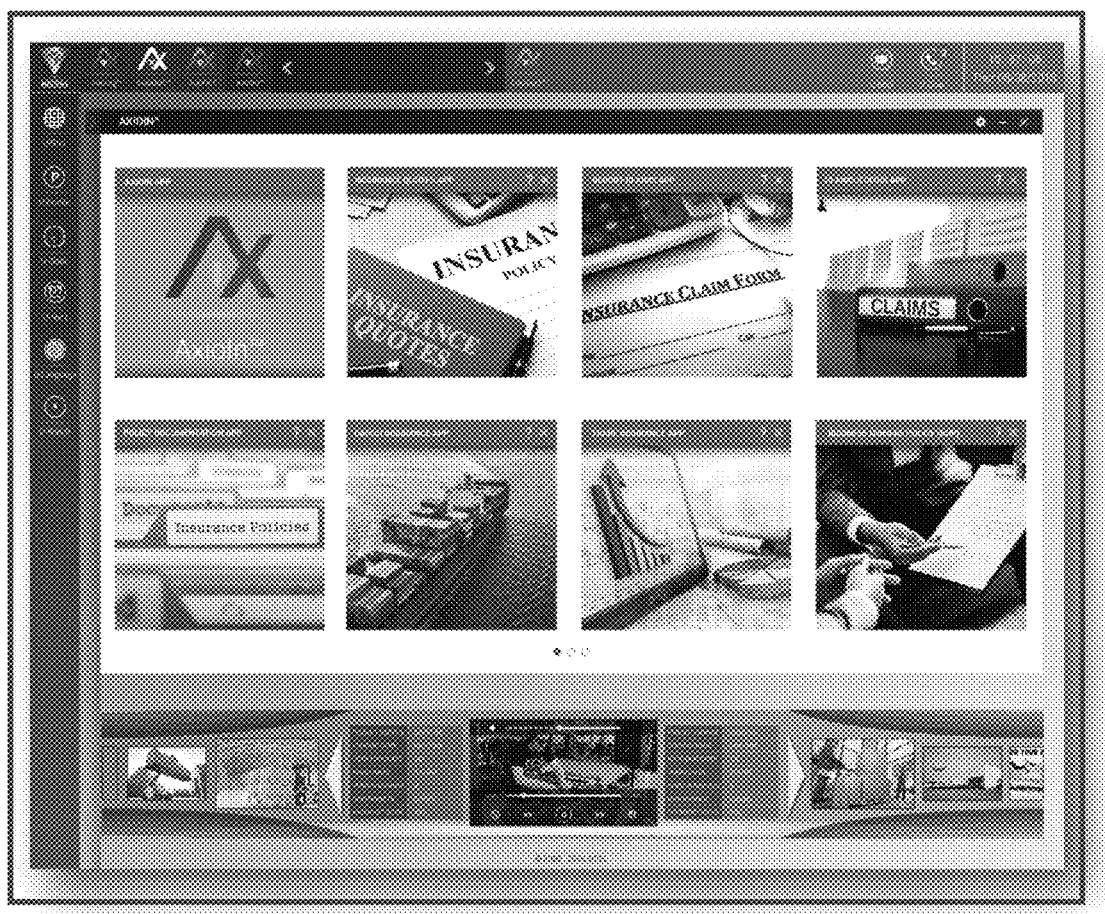
FIG. 16 is an e-Insurance platform U-grid.
Figure 17:
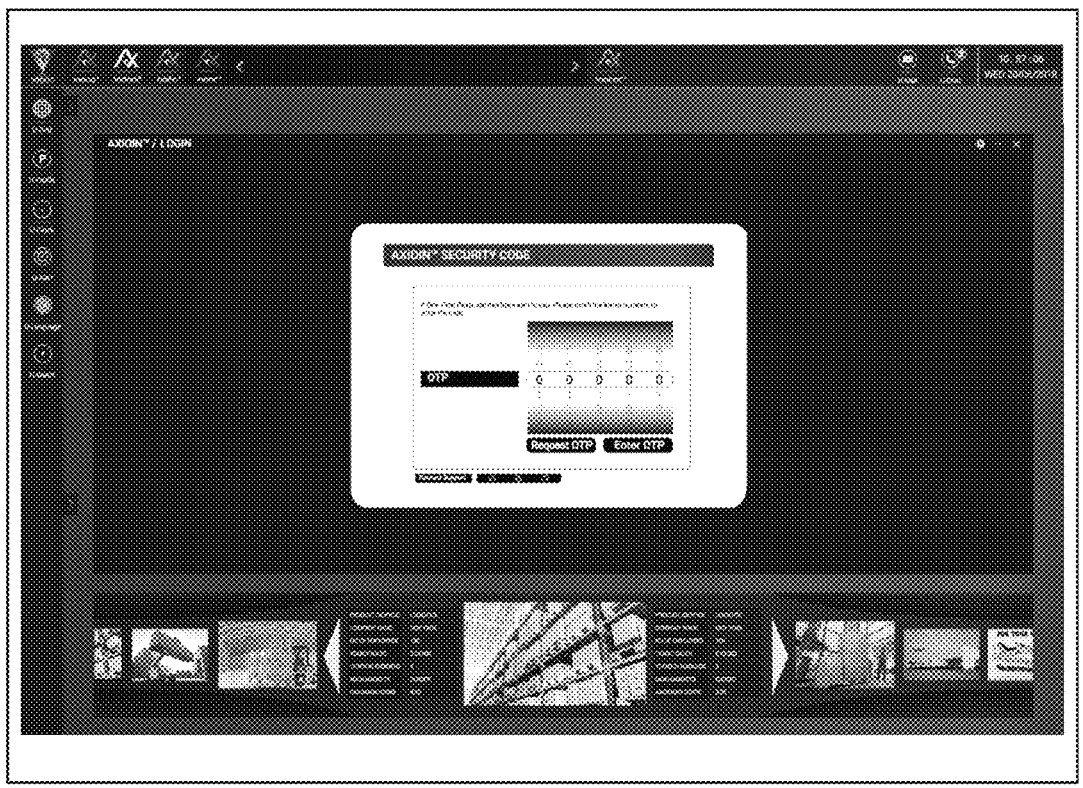
FIG. 17 is a multi-factor authentication screen for an e-Insurance application.

FIGS. 16-23 illustrates various screens and interfaces related to the above steps of FIG. 15. FIG. 16 illustrates launching an AxioIn Application from an e-Insurance platform of AxioIn U-grid. FIG. 17 illustrates multi-factor authentication for e-insurance Application within e-Insurance platform AxioIn. FIG. 18 illustrates Insurance Landing page for e-Insurance Platform AxioIn.

FIG. 19 provides an example of how Insurance Companies can devise the Dynamic Product Offerings for Insurance using an online e-Insurance platform such as AxioIn™, and offer automatic risk-based insurance premiums for the requested policies based on the buyer's and seller's AxioScores, Point of Loading (POL), Point of Discharge (POD), Police Type, Total Shipment or Financing Trade value, Volume, and Commodity among other important factors.

FIG. 19 generally illustrates an interface 210 for dynamic product offerings for e-insurance according to the principles of the present disclosure. FIG. 19 provides an example of using a Business Intelligence Analytics Tool to conduct market research and gain market insights into e-Insurance Market specifically examining the trade finance being insured between two geographical regions. Insurance companies can use these market insights to devise new Dynamic Product Offerings (DPO) 116 in the area of e-Insurance and InsureTech for targeted customers with pre-defined entity performance and risk profiles as well as specific markets and commodities.

FIG. 20 generally illustrates an interface 212 for dynamic product offerings for e-insurance according to the principles of the present disclosure. FIG. 20 provides an example of Dynamic Product Offerings 116 based on the market insights gained by the insurers from using Business Intelligence Analytics Tool to conduct market research. A new DPO 116 can be devised to provide one of three types of covers; Business Owners, Cargo, or Trade Credit with insurance premium tied to the cover value and cover percentage offered and based on the risk profile of the customers and risk characteristics of the transaction or asset being insured.

FIG. 20 provides an example of how Insurance Companies can devise the Dynamic Product Offerings for Insurance using an online e-Insurance platform such as AxioIn™, and offer automatic risk-based insurance premiums for the requested policies based on the buyer's and seller's AxioScores, Point of Loading (POL), Point of Discharge (POD), Police Type, total Shipment or Financing Trade value, Volume, and Commodity among other factors.

FIG. 21 illustrates pre-qualified insurance quotes from e-Insurance DPO. FIG. 22 illustrates evaluating market performance of Dynamic Product Offerings (DPO) for e-Insurance. FIG. 23 illustrates e-Insurance Policy Details.

Figure 24:
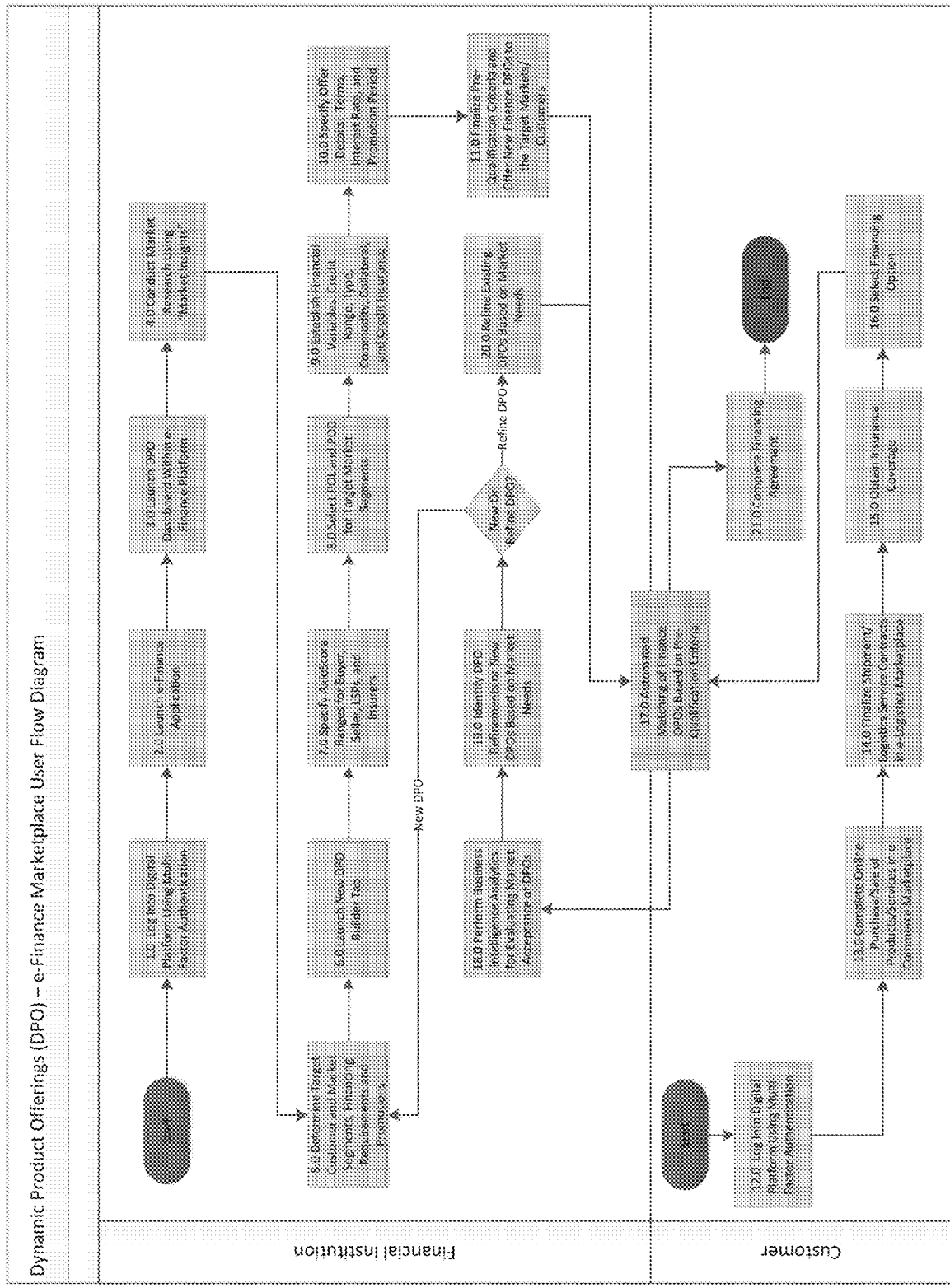
FIG. 24 is a user-flow diagram of a dynamic product offering in an e-Finance marketplace.

With reference now to FIG. 24, an implantation of the system 100 related to a DPO in a e-Finance Marketplace is illustrated. This section illustrates an example of usage of DPO in an online e-Finance platform. A user flow diagram depicting various system and user interaction steps is shown in FIG. 24, and each system and user interaction step in the diagram is further elaborated below, with reference to Steps 1.0, 2.0, etc. in FIG. 24. The step-by-step detailed system implementation of this invention for e-Finance is further depicted through a series of relevant User Interface screens illustrated in FIGS. 25-32.

At step 1.0, the step of "Log Into Digital Platform Using Multi-Factor Authentication" may occur (See FIG. 4). At step 1.0, Financial Institution or Financial Service Provider Logs into the digital platform using multi-factor authentication.

Figure 25:
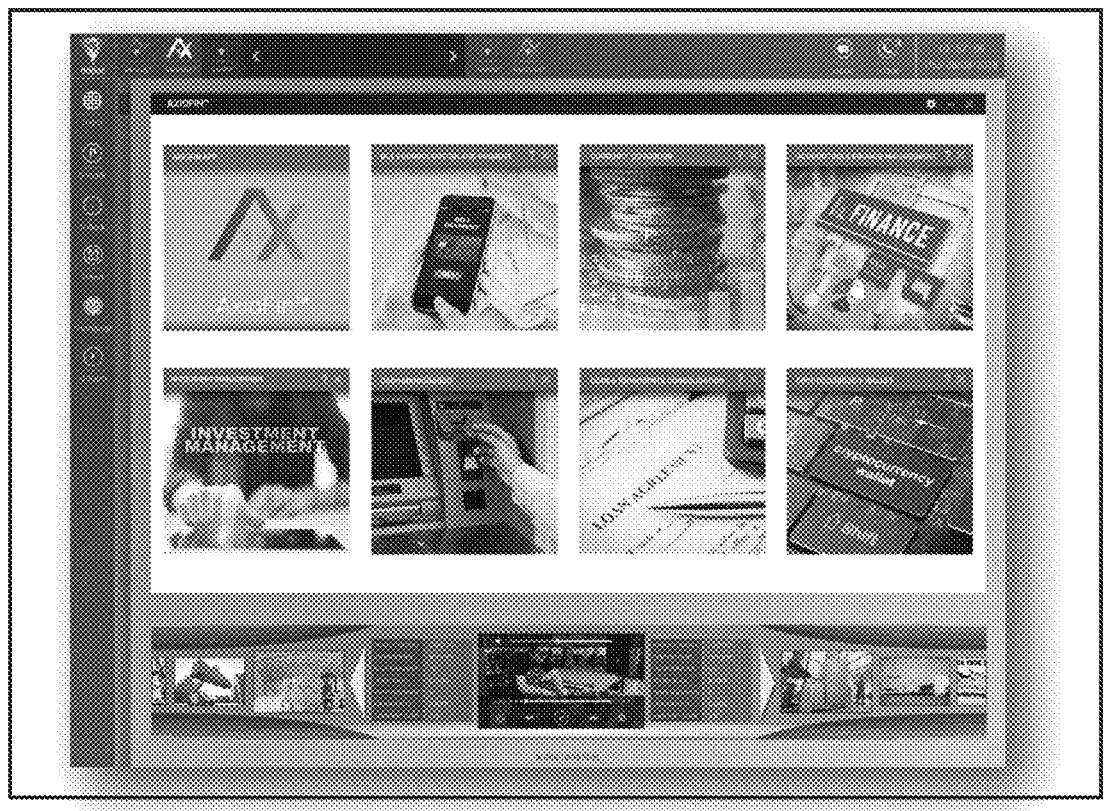
FIG. 25 is an e-Finance platform U-grid.
Figure 26:
FIG. 26 is a security authentication screen for an e-Finance platform.

At step 2.0, the step of "Launch e-Finance Application" may occur (See FIGS. 25 and 26). At step 2.0, Financial Institution or Financial Service Provider launches e-Finance Platform (A) and e-Finance Application AxioIn (B) that provides Graphical User Interface (GUI) access to launch DPO Dashboard. Financial Institution or Financial Service Provider completes additional authentication required to log into AxioFin Landing Page.

Figure 27:
FIG. 27 is a landing page for a financial institution.

At step 3.0, the step of "Launch DPO Dashboard Within e-Finance Platform" may occur (See FIG. 27). At step 3.0, Financial Institution or Financial Service Provider launches DPO Dashboard by clicking on "DPO Dashboard" icon on the right-side bar from within AxioFin Application.

Figure 28:
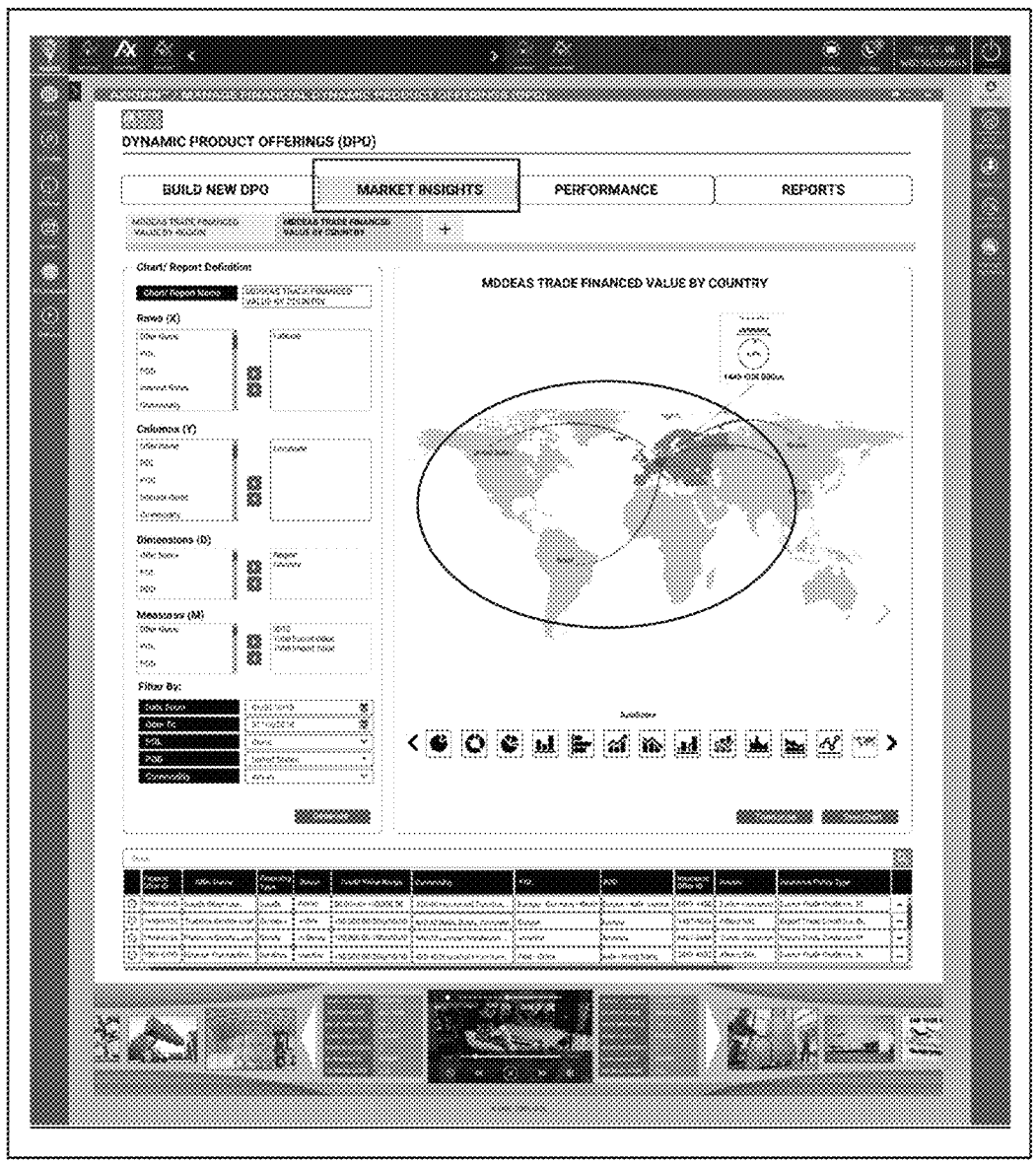
FIG. 28 illustrates a dashboard interface for market research for an e-Finance dynamic product offering.

At step 4.0, the step of "Conduct Market Research Using Market Insights" may occur (See FIG. 28). At step 4.0, Using "MARKET INSIGHTS" tab of DPO dashboard at A, the Service Providers can conduct market research by using Business Intelligence Analytical Capability of DPO Dashboard to gain market insights such as by country e.g. Germany at B and its level of trade financing in a region shown at C.

At step 5.0, the step of "Determine Target Customer and Market Segments, Financing Requirements and Promotions" may occur (See FIG. 28). At step 5.0, Based on the analysis conducted in Step 4, Financial Institution or Financial Service Provider determines New DPO parameters for targeting specific Customer, Market, and Financial Services segments to devise effective promotional offers.

Figure 29:
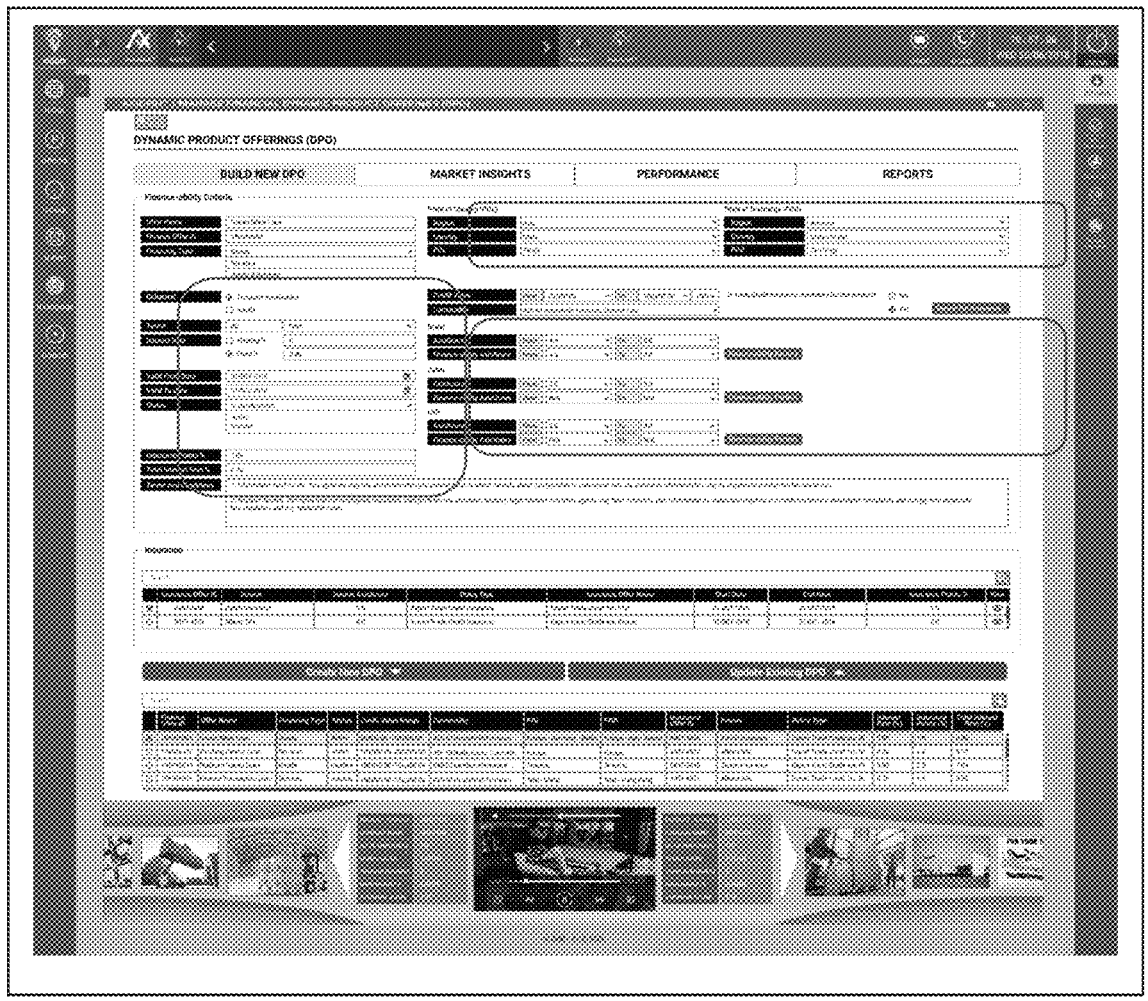
FIG. 29 generally illustrates an interface for dynamic product offerings for e-finance according to the principles of the present disclosure.

At step 6.0, the step of "Launch New DPO Builder Tab" may occur (See FIG. 29). At step 6.0, Financial Services Provider launches New DPO Builder by clicking on "BUILD NEW DPO" tab.

At step 7.0, the step of "Specify AxioScore Ranges for Buyer, Seller, LSPs, and Insurers" may occur (See FIG. 29). At step 7.0, Financial Services Provider will start populating DPO pre-qualification criteria by specifying AxioScore Ranges of target buyers, sellers, LSPs, and Insurance Companies.

At step 8.0, the step of "Select POL and POD for Target Market Segments" may occur (See FIG. 29). At step 8.0, Target Geographical Market segments are specified by selecting Point of Loading, and Point of Discharge of the transaction.

At step 9.0, the step of "Establish Financial Variables: Credit Range, Type, Commodity, Collateral, and Credit Insurance" may occur (See FIG. 29). At step 9.0, The Financial Services Provider establishes financial variables for the loans such as Credit Value Range and Type of Financing Offered, Commodity being transacted, Collateral Required and Credit Insurance being bundled to mitigate the underlying risk of non-payments.

At step 10.0, the step of "Specify Offer Details: Terms, Interest Rate, and Promotion Period." may occur (See FIG. 29). At step 10.0, Based on the established variables in the previous step, Financial Institution specifies the offer details such as Loan and Payment Terms, Interest Rates on the Loans, and Promotion Periods during which the offers are made available and valid.

At step 11.0, the step of "Finalize Pre-Qualification Criteria and Offer New DPOs to the Target Markets/Customers" may occur (See FIG. 29). At step 11.0, All DPO pre-qualification criteria are established, and DPOs are saved by clicking on "Create New DPO" button. The new DPOs are released to the marketplace by activating newly created DPOs by changing their status to "Active".

At step 12.0, the step of "Log Into Digital Platform Using Multi-Factor Authentication" may occur (See FIG. 4). At step 12.0, Customer, either the buyer or seller logs into online e-Commerce platform using appropriate security mechanism.

At step 13.0, the step of "Complete Online Purchase/Sale of Products/Services in e-Commerce Marketplace" may occur (See FIG. 9). At step 13.0, The Buyer/Seller completes purchase/sale transaction of products and services by entering into a preliminary Buy Sell Agreement using Units Cost Timetable framework.

At step 14.0, the step of "Finalize Shipment/Logistics Service Contracts in e-Logistics Marketplace" may occur (See FIG. 14). At step 14.0, The Buyer/Seller will launch e-Logistics Application and obtain Shipment/LSP Contract based on Delivery and Shipping Requirements.

At step 15.0, the step of "Obtain Insurance Coverage" may occur (See FIG. 23). At step 15.0, Upon finalization of shipment service contract, the customer will obtain appropriate insurance coverage (Cargo, Trade Credit, or Business Owners) based on their risk tolerance in order to mitigate their transaction and business owner risk.

Figure 30:
FIG. 30 illustrates pre-qualified financing offers through e-Finance dynamic product offering matching with a customer profile.

At step 16.0, the step of "Select Financing Option" may occur (See FIG. 30). At step 16.0, The Customer is presented with multiple payment or financing options for the transaction. One of the options is to obtain financing from AxioFin e-Finance Platform.

At step 17.0, the step of "Automated Matching of Finance DPOs Based on Pre-Qualification Criteria" may occur (See FIG. 30). At step 17.0, The e-Finance Platform will automatically match Customer's Financing Requirements with the pre-qualification criteria of available Finance DPOs and present a list of matching Pre-qualified Financing Offers.

Figure 31:
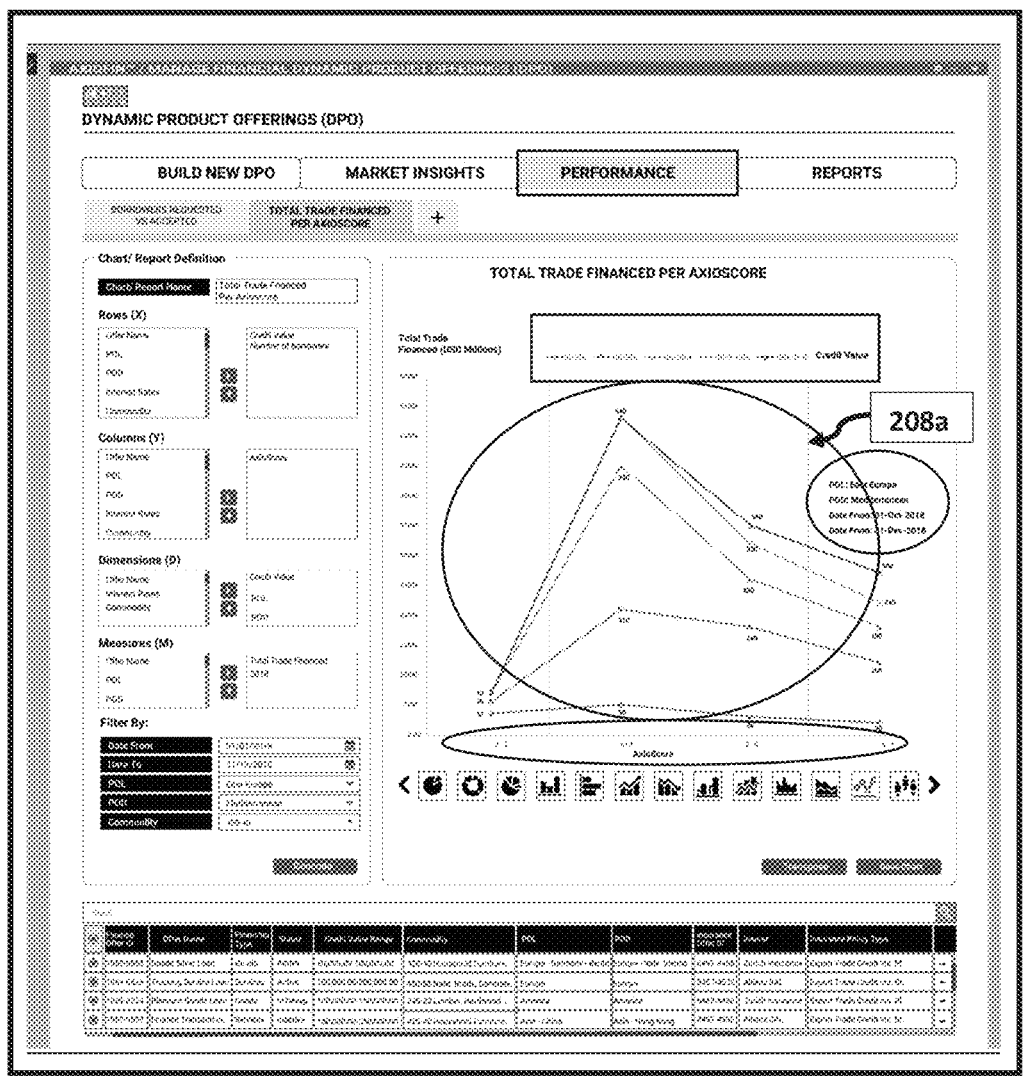
FIG. 31 generally illustrates an interface for evaluating performance of dynamic product offerings for e-Finance according to the principles of the present disclosure.

At step 18.0, the step of "Perform Business Intelligence Analytics for Evaluating Market Acceptance of DPOs" may occur (See FIG. 31). At step 18.0, Using DPO Dashboard's "Performance" tab, the Financial Service Providers can evaluate the performance and effectiveness of their DPOs in the marketplace. The evaluation reports can be saved and shared with other team members and can be re-launched from the "Reports" tab of DPO Dashboard.

Figure 32:
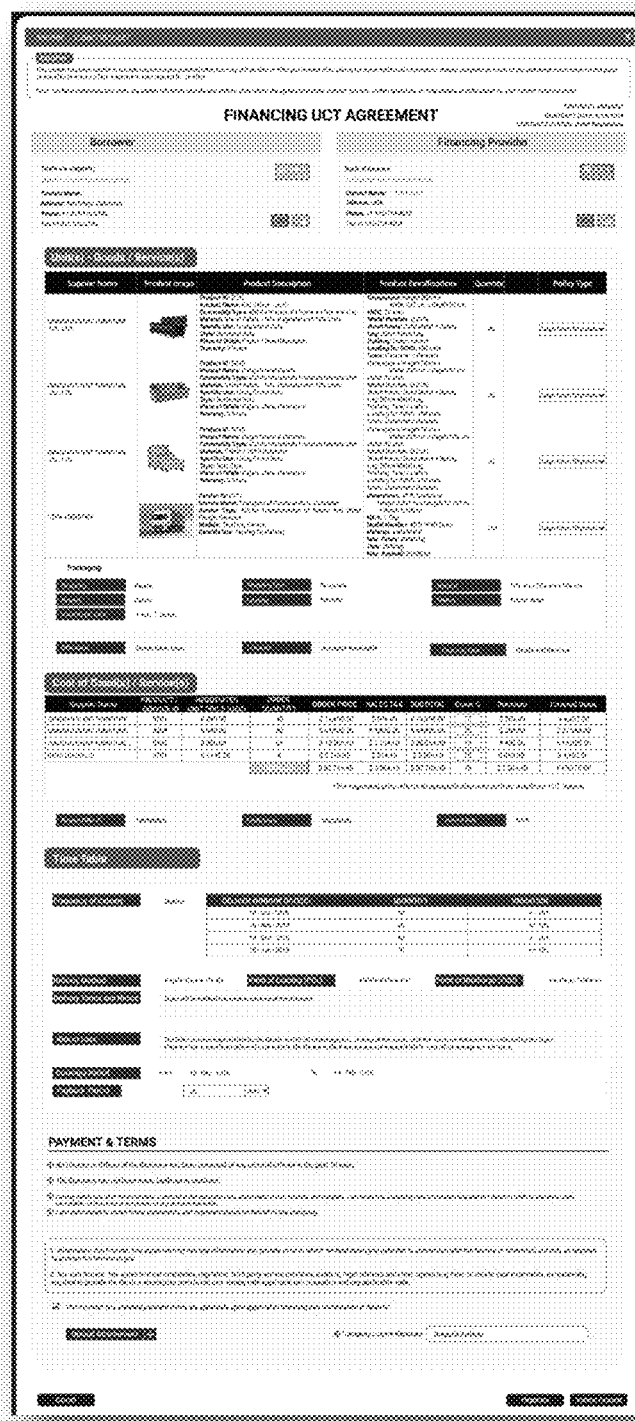
FIG. 32 illustrates a financing UCT agreement obtained from matching finance DPOs.

At step 19.0, the step of "Identify DPO Refinements or Need for New DPOs Based on Market Needs" may occur (See FIG. 32). At step 19.0, From the above analysis, Financial Services Providers can identify refinements to current DPO pre-qualification criteria or identify need for new DPOs by conducting market research and identifying market gaps.

Also, the financial services provider may determine whether a new or refined DPO is desired. The financial services provider performs cost-benefit analysis to determine the need for either building new DPOs or making refinements to the existing DPOs.

At step 20.0, the step of "Refine Existing DPOs Based on Market Needs" may occur (See FIG. 29). At step 20.0, If the business decision is to refine the existing DPOs, appropriate modifications are made to the pre-qualification criteria of existing DPOs and re-offered to the marketplace.

At step 21.0, the step of "Complete Financing Agreement" may occur (See FIG. 32). At step 21.0, Customer and Financial Service Provider finalize the transaction by entering into a Financing Service Agreement using UCT (Unit Cost Timetable) framework and obtain/issue necessary financing.

FIGS. 25-32 illustrate various screens and interfaces related to the above steps for the e-Financing implementation described above. FIG. 25 illustrating launching AxioFin Application from the e-Finance platform AxioFin U-grid. FIG. 26 illustrates the e-Finance platform and AxioFin level of security authentication. FIG. 27 illustrates a financial institution landing page for e-Finance platform AxioFin. FIG. 28 illustrates financial institution conducting market research for identifying e-Finance DPOs.

FIG. 29 generally illustrates an interface 206 for dynamic product offerings 116 for e-finance according to the principles of the present disclosure. FIG. 29 provides an example of Dynamic Product Offerings (DPO) 116 in the area of online e-Finance service market and FinTech area offering trade finance loans with pre-defined interest rates. This instrument combines Trade Finance Loan and Trade Credit Insurance and provides pre-qualified finance loan offers to targeted borrowers based on their entity performance and risk profiles and characteristics of their transaction, markets, and collateral being offered.

FIG. 29 provides an example where Financial Institutions can provide Pre-qualified Dynamic Product Offerings (DPOs) 116 to their potential borrowers with the interest rates on the loans and loan terms that are dynamically tailored based on the real-time entity performance and risk profile of the customers as reflected in their AxioScores.

FIG. 30 illustrates pre-qualified finance offers through matching finance DPOs.

FIG. 31 generally illustrates an interface 208 for evaluating performance of dynamic product offerings 116 for e-Finance according to the principles of the present disclosure. FIG. 31 provides an example of usage of a Business Intelligence Analytics Tool to analyze the Dynamic Product Offerings (DPOs) 116 performance in the area of online e-Finance service market and FinTech area. The line chart 208a provides the geographical distribution of trade finance loans distributed over their entity performance indicators (AxioScore™). Financial institutions can refine the DPO criteria to target under-financed customers or geographical regions of the market for the transaction.

FIG. 32 illustrates a financing UCT agreement obtained from matching finance DPOs.

These Dynamic Product Offerings 116 are specifically designed to suitably reward the participants' entity performance, encourage their business excellence, and help sufficiently mitigate the risks for all the participants in the global value chain. For example, businesses or customers with higher AxioScores indicating an objectively high degree of reliability may qualify for higher value offers or may qualify for a higher quantity of offers relative to entities with lower scores.

The DPO 116 can be dynamically tailored and made available at the point of introduction of a product or service to pre-qualified potential customers to help them complete their transactions.

DPO providers can continuously conduct market research and gain new insights in the market as provided through the DPO Dashboard of FIG. 6. They can actively manage their product and service offerings and suitably modify the DPOs' pre-qualification criteria, and their terms and conditions based on their market acceptance rate, and redesign and test the new products based on geography, industry, and company size, among other factors, to improve customer retention, enhance market penetration, and achieve return on capital objectives.

DPO providers can continuously improve the product offerings by closely monitoring their performance in real-time through a comprehensive DPO performance dashboard using Business Intelligence Analytics for example shown in FIG. 7.

Figure 33:
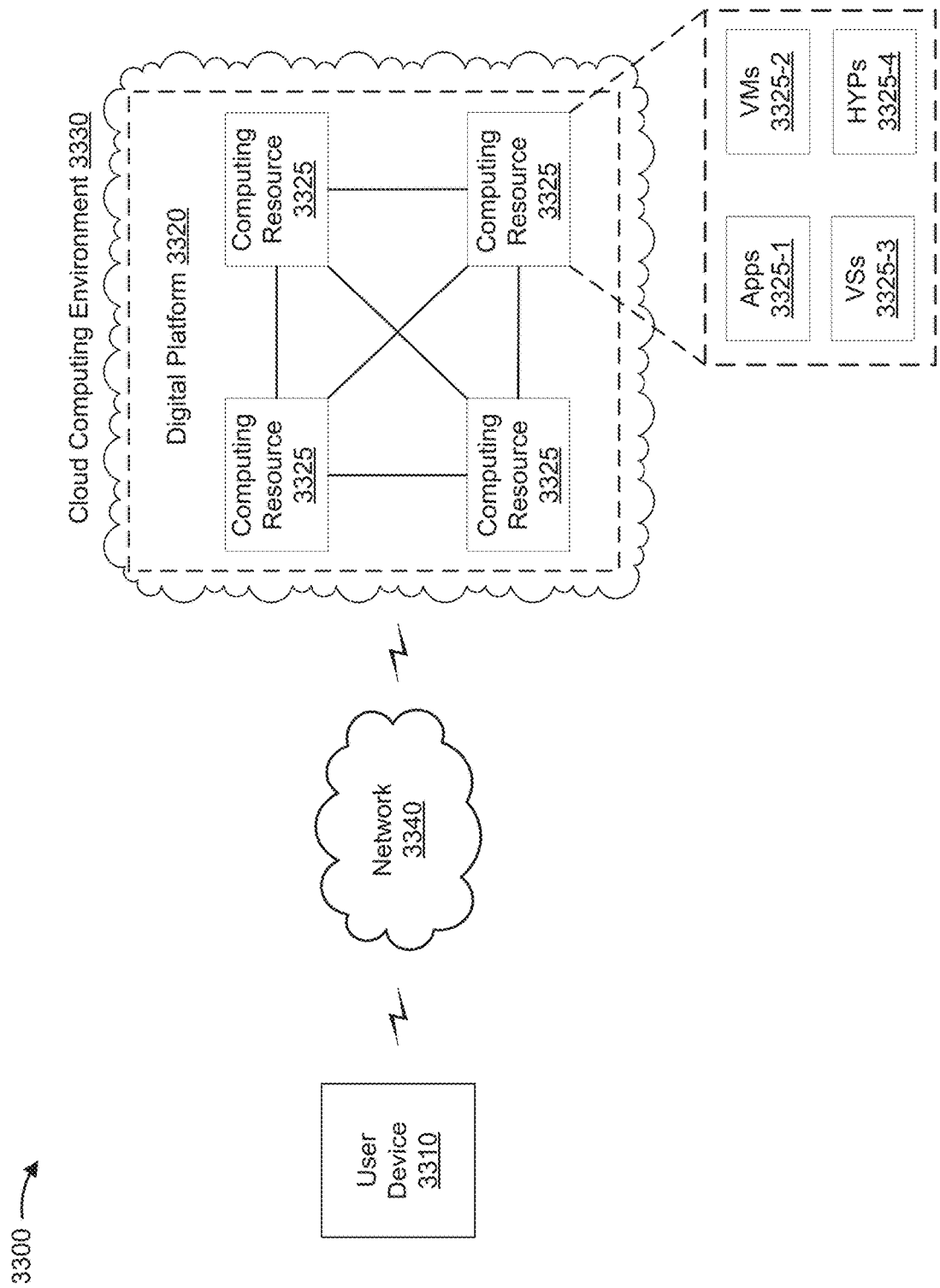
FIG. 33 is a diagram of an example environment in which systems and/or methods, described herein, may be implemented.

FIG. 33 is a diagram of an example environment 3300 in which systems and/or methods, described herein, may be implemented. As shown in FIG. 33, environment 3300 may include a user device 3310, a digital platform 3320 hosted by a cloud computing environment 3330, and/or a network 3340. Devices of environment 3300 may interconnect via wired connections, wireless connections, or a combination of wired and wireless connections.

User device 3310 includes one or more devices capable of receiving, generating, storing, processing, and/or providing information, such as information described herein. For example, user device 3310 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

Digital platform 3320 includes one or more devices capable of receiving, generating, storing, processing, and/or providing information, such as information described herein. For example, digital platform 3320 may include a server device (e.g., a host server, a web server, an application server, and/or the like), a data center device, or a similar device. In some implementations, digital platform 3320 may perform one or more steps and/or actions that are described in FIGS. 1-32.

In some implementations, digital platform 3320 may receive data that identifies a set of performance indicators associated with an entity and/or a risk profile of the entity. Additionally, or alternatively, digital platform 3320 may identify characteristics of the entity based on a set of performance indicators and a risk profile of an entity. In some implementations, digital platform 3320 may identify criteria for dynamic product offerings (DPOs) for a target market based on identified characteristics of the entity. In some implementations, digital platform 3320 may determine a target reward and an expected risk for a new DPO based on the criteria. In some implementations, digital platform 3320 may perform one or more actions that cause the new dynamic product offering to be released in the target market.

In some implementations, digital economy platform 1620 may include a data intake module, a standardization module, a filtering module, a business intelligence (BI) analytics module, a machine learning module, a display/output module, and/or the like. In some implementations, one or more components or elements of digital platform 3320 may be supported by an external service (e.g., outside of digital platform 3320). In this case, digital platform 3320 may interface with any components or elements used to provide the external service (e.g., using a communication interface, such as an API or another type of interface).

In some implementations, digital platform 3320 may host a website that user device 3310 utilizes to access one or more applications described herein (e.g., applications 102, application 3325, and/or the like). In some implementations, digital platform 3320 may support the website that is accessible by user device 3310. For example, the website may be hosted by another device, such as an e-commerce platform or another server device and digital platform 3320 may provide the other device with an overall performance score, with a recommendation associated with the overall performance score, and/or the like.

In some implementations, as shown, digital platform 3320 may be hosted in cloud computing environment 3330. Notably, while implementations described herein describe digital platform 3320 as being hosted in cloud computing environment 3330, in some implementations, digital platform 3320 might not be cloud-based (i.e., may be implemented outside of a cloud computing environment) or might be partially cloud-based.

Cloud computing environment 3330 includes an environment that hosts digital platform 3320. Cloud computing environment 3330 may provide computation, software, data access, storage, and/or other services that do not require end-user knowledge of a physical location and configuration of system(s) and/or device(s) that host digital platform 3320. As shown, cloud computing environment 3330 may include a group of computing resource 3325 (referred to collectively as "computing resources 3325 and individually as "computing resource 3325").

Computing resource 3325 includes one or more personal computers, workstation computers, server devices, or another type of computation and/or communication device. In some implementations, computing resource 3325 may host digital platform 3320. The cloud resources may include compute instances executing in computing resource 3325, storage devices provided in computing resource 3325, data transfer devices provided by computing resource 3325, etc. In some implementations, computing resource 3325 may communicate with other computing resources 3325 via wired connections, wireless connections, or a combination of wired and wireless connections.

As further shown in FIG. 33, computing resource 3325 may include a group of cloud resources, such as one or more applications ("APPs") 3325-1, one or more virtual machines ("VMs") 3325-2, virtualized storage ("VSs") 3325-3, one or more hypervisors ("HYPs") 3325-4, or the like.

Application 3325-1 includes one or more software applications that may be provided to or accessed by user device 3310. Application 3325-1 may eliminate a need to install and execute the software applications on user device 3310. For example, application 3325-1 may include software associated with digital platform 3320 and/or any other software capable of being provided via cloud computing environment 3330. In some implementations, one application 3325-1 may send/receive information to/from one or more other applications 3325-1, via virtual machine 3325-2. In some implementations, application 3325-1 may include applications 102. In some implementations, application 3325-1 may include an application capable of interacting with applications 102.

Virtual machine 3325-2 includes a software implementation of a machine (e.g., a computer) that executes programs like a physical machine. Virtual machine 3325-2 may be either a system virtual machine or a process virtual machine, depending upon use and degree of correspondence to any real machine by virtual machine 3325-2. A system virtual machine may provide a complete system platform that supports execution of a complete operating system ("OS"). A process virtual machine may execute a single program, and may support a single process. In some implementations, virtual machine 3325-2 may execute on behalf of a user (e.g., user device 3310), and may manage infrastructure of cloud computing environment 3330, such as data management, synchronization, or long-duration data transfers.

Virtualized storage 3325-3 includes one or more storage systems and/or one or more devices that use virtualization techniques within the storage systems or devices of computing resource 3325. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 3325-4 provides hardware virtualization techniques that allow multiple operating systems (e.g., "guest operating systems") to execute concurrently on a host computer, such as computing resource 3325. Hypervisor 3325-4 may present a virtual operating platform to the guest operating systems, and may manage the execution of the guest operating systems. Multiple instances of a variety of operating systems may share virtualized hardware resources.

Network 3340 includes one or more wired and/or wireless networks. For example, network 3340 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 33 are provided as an example. In practice, there may be additional devices and/or networks, fewer devices and/or networks, different devices and/or networks, or differently arranged devices and/or networks than those shown in FIG. 33. Furthermore, two or more devices shown in FIG. 33 may be implemented within a single device, or a single device shown in FIG. 33 may be implemented as multiple, distributed devices. Additionally, or alternatively, a set of devices (e.g., one or more devices) of environment 3300 may perform one or more functions described as being performed by another set of devices of environment 3300.

Figure 34:
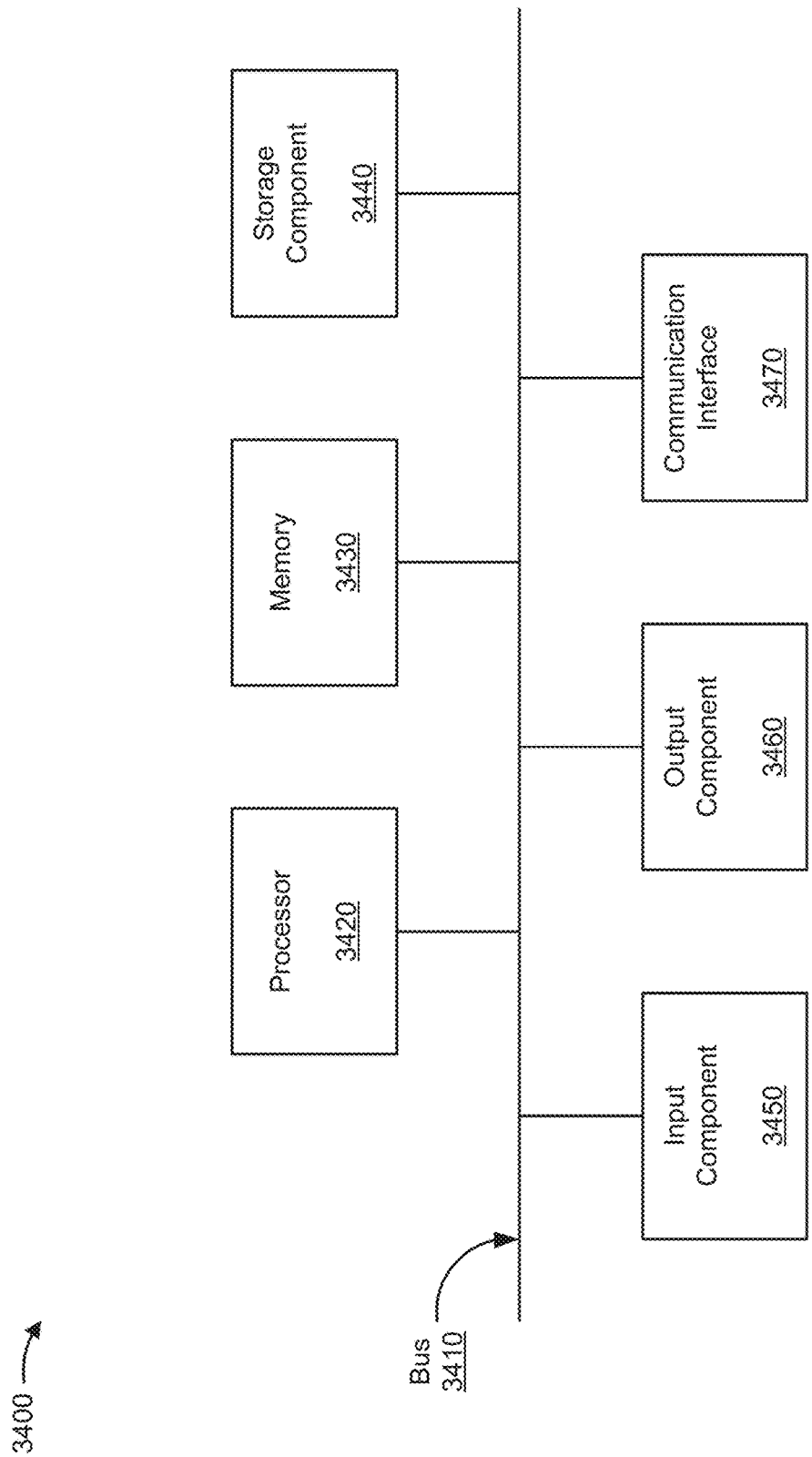
FIG. 34 is a diagram of example components of one or more devices of FIG. 33.

FIG. 34 is a diagram of example components of a device 3400. Device 3400 may correspond to user device 3310 and/or digital platform 3320. In some implementations, user device 3310 and/or digital platform 3320 may include one or more devices 3400 and/or one or more components of device 3400. As shown in FIG. 34, device 3400 may include a bus 3410, a processor 3420, a memory 3430, a storage component 3440, an input component 3450, an output component 3460, and a communication interface 3470.

Bus 3410 includes a component that permits communication among the components of device 3400. Processor 3420 is implemented in hardware, firmware, or a combination of hardware and software. Processor 3420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 3420 includes one or more processors capable of being programmed to perform a function. Memory 3430 includes a random access memory (RAM), a read only memory (ROM), and/or another type of dynamic or static storage device (e.g., a flash memory, a magnetic memory, and/or an optical memory) that stores information and/or instructions for use by processor 3420.

Storage component 3440 stores information and/or software related to the operation and use of device 3400. For example, storage component 3440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 3450 includes a component that permits device 3400 to receive information, such as via user input (e.g., a touch screen display, a keyboard, a keypad, a mouse, a button, a switch, and/or a microphone). Additionally, or alternatively, input component 3450 may include a sensor for sensing information (e.g., a global positioning system (GPS) component, an accelerometer, a gyroscope, and/or an actuator). Output component 3460 includes a component that provides output information from device 3400 (e.g., a display, a speaker, and/or one or more light-emitting diodes (LEDs)).

Communication interface 3470 includes a transceiver-like component (e.g., a transceiver and/or a separate receiver and transmitter) that enables device 3400 to communicate with other devices, such as via a wired connection, a wireless connection, or a combination of wired and wireless connections. Communication interface 3470 may permit device 3400 to receive information from another device and/or provide information to another device. For example, communication interface 3470 may include an Ethernet interface, an optical interface, a coaxial interface, an infrared interface, a radio frequency (RF) interface, a universal serial bus (USB) interface, a Wi-Fi interface, a cellular network interface, or the like.

Device 3400 may perform one or more processes described herein. Device 3400 may perform these processes based on processor 3420 executing software instructions stored by a non-transitory computer-readable medium, such as memory 3430 and/or storage component 3440. A computer-readable medium is defined herein as a non-transitory memory device. A memory device includes memory space within a single physical storage device or memory space spread across multiple physical storage devices.

Software instructions may be read into memory 3430 and/or storage component 3440 from another computer-readable medium or from another device via communication interface 3470. When executed, software instructions stored in memory 3430 and/or storage component 3440 may cause processor 3420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 34 are provided as an example. In practice, device 3400 may include additional components, fewer components, different components, or differently arranged components than those shown in FIG. 34. Additionally, or alternatively, a set of components (e.g., one or more components) of device 3400 may perform one or more functions described as being performed by another set of components of device 3400.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such. Further, the phrase "based on" is intended to mean "based, at least in part, on" unless explicitly stated otherwise.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of facilitating marketplace transactions among entities, comprising:
    identifying, by a device, characteristics of a plurality of entities based on at least one of products, services, market gaps, economic incentives, markets, geographical locations, trade transactions, performance indicators and risk profiles based on data which includes a plurality of historical, current, and planned market transaction activities involving the foregoing;
    identifying, by the device, criteria for dynamic product offerings, the criteria being continuously and dynamically updated using the identified characteristics;
    determining, by the device, at least one of a target benefit, reward, and financial return and an expected risk for a new dynamic product offering using the criteria for the dynamic product offerings; and
    performing, by the device, one or more actions that cause the new dynamic product offering to be released digitally and automatically matched to online participants in the target market to facilitate a market transaction among the participants.

2. The method of claim 1, further comprising:
identifying performance and risk indicators of the plurality of entities;
identifying transaction characteristics of the plurality of entities; and
wherein performing the one or more actions comprises:
devising the dynamic product offering,
automatically refining the dynamic product offering, and
managing the dynamic product offering.

3. The method of claim 2, wherein the transaction characteristics include market characteristics.

4. The method of claim 2 further comprising studying market gaps and economic incentives for the dynamic product offerings.

5. The method of claim 4 further comprising leveraging big data and analytics to conduct market research and gain insight into product and service offering gaps.

6. The method of claim 2 further comprising identifying patterns of the performance indicators and the transaction characteristics.

7. The method of claim 2 wherein the criteria is pre-qualification criteria.

8. The method of claim 2 further comprising optimizing a financial return and risk of the dynamic product offering.

9. The method of claim 2 further comprising automatically matching the dynamic product offering based on participant risk profiles and transactional characteristics.

10. The method of claim 2 further comprising refining the criteria and increasing market acceptance of the dynamic product offering.

11. The method of claim 2 further comprising monitoring a performance of the dynamic product offering and devising and testing new dynamic product offerings in response to a change in market conditions.

12. The method of claim 1, wherein the dynamic product offering is at least one of a product offer, a service offer, a carrier private marketplace, a finance offer, or an insurance offer.

13. The method of claim 1 further comprising receiving the performance indicator and the identified characteristics and, in response thereto, automatically creating the dynamic product offering.

14. A system, comprising:
a cloud platform of at least one integrated platform including:
an electronic commerce (e-commerce) platform,
an electronic logistics (e-logistics) platform,
an electronic finance (e-finance) platform, and
an electronic insurance (e-insurance) platform; and
an analytics platform that includes:
one or more communication interfaces for interacting with the set of cloud platforms,
one or more memories,
one or more processors, communicatively coupled to the one or more memories, configured to:
identify characteristics of a plurality of entities based on at least one of products, services, market gaps, economic incentives, markets, geographical locations, trade transactions, performance indicators, and risk profiles based on data which include a plurality of historical, current, and planned market transaction activities involving the foregoing;
identify criteria for dynamic product offerings, the criteria being continuously and dynamically updated using the identified characteristics;
determine at least one of a target benefit, reward, and financial return and an expected risk for a new dynamic product offering using the criteria for the dynamic product offerings; and
perform one or more actions that cause the new dynamic product offering to be released digitally and automatically matched to online participants in the target market to facilitate a market transaction among the participants.

15. The system of claim 14, wherein the one or more processors are further configured to:
identify performance and risk indicators of the plurality of entities;
identify transaction characteristics of the plurality of entities;
automatically devise the dynamic product offering; and
manage the dynamic product offering.

16. The system of claim 14, further comprising:
an output component for causing information associated with the new dynamic product offering to be displayed via a graphical user interface.

17. The system of claim 14, wherein the e-Commerce platform further comprises an interface for creating a dynamic product offering in the form of a product offer.

18. The system of claim 14, wherein the e-Logistics platform further comprises an interface for creating a dynamic product offering in the form of a service offer.

19. The system of claim 14, wherein the e-Finance platform further comprises an interface for creating a dynamic product offering in the form of a finance offer.

20. The system of claim 14, wherein the e-Insurance platform further comprises an interface for creating a dynamic product offering in the form of an insurance offer.

* * * * *